United States Patent
Troy et al.

(10) Patent No.: US 10,929,670 B1
(45) Date of Patent: Feb. 23, 2021

(54) MARKER-TO-MODEL LOCATION PAIRING AND REGISTRATION FOR AUGMENTED REALITY APPLICATIONS

(71) Applicant: The Boeing Company, Chicago, IL (US)

(72) Inventors: James J. Troy, Issaquah, WA (US); Christopher D. Esposito, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/658,395

(22) Filed: Oct. 21, 2019

(51) Int. Cl.
*G06K 9/00* (2006.01)
*G06T 19/00* (2011.01)
*H04W 4/80* (2018.01)
*G06K 7/14* (2006.01)

(52) U.S. Cl.
CPC ....... *G06K 9/00671* (2013.01); *G06K 7/1417* (2013.01); *G06K 9/00214* (2013.01); *G06T 19/006* (2013.01); *H04W 4/80* (2018.02)

(58) Field of Classification Search
CPC ............... G06T 19/006; G06K 7/1417; G06K 9/00214; G06K 9/00671; H04W 4/80
See application file for complete search history.

(56) References Cited

U.S. PATENT DOCUMENTS

| | | | |
|---|---|---|---|
| 6,536,892 B1 | 3/2003 | Chang et al. | |
| 7,589,636 B2 | 9/2009 | Ayyagari et al. | |
| 8,060,835 B2 | 11/2011 | Newcomer et al. | |
| 8,376,457 B2 | 2/2013 | Muirhead | |
| 8,384,519 B2 | 2/2013 | Kuhl et al. | |
| 8,421,604 B2 | 4/2013 | Bellows et al. | |
| 8,489,276 B2 | 7/2013 | Callahan et al. | |

(Continued)

FOREIGN PATENT DOCUMENTS

| | | |
|---|---|---|
| EP | 2438880 A1 | 10/2010 |
| JP | H0886615 A | 4/1996 |
| WO | 2011104167 A1 | 1/2011 |

OTHER PUBLICATIONS

English Abstract of JPH0886615A.
(Continued)

*Primary Examiner* — Jeffery A Brier
(74) *Attorney, Agent, or Firm* — Ostrager Chong Flaherty & Broitman P.C.

(57) ABSTRACT

A method for providing just-in-time access to data for calibrating an augmented reality (AR) device relative to an operation environment and then using the calibration data to register virtual content generated by the AR device with a scene being viewed by a user in the operation environment. An AR device is calibrated by pairing marker identifiers of 2-D markers affixed to objects in a physical environment with 3-D locations of those objects specified in a virtual environment containing 3-D model of those objects and then a marker-to-model location pairing list is generated. The pairing list is used to align displayed virtual 3-D content with an object appearing in the visualized physical environment. A location correction is computed at run-time based on a current AR device-to-marker offset computed from an image of the 2-D marker and the 3-D location of the object retrieved from the pairing list.

22 Claims, 15 Drawing Sheets

(56) References Cited

U.S. PATENT DOCUMENTS

| | | | |
|---|---|---|---|
| 8,996,242 | B2 | 3/2015 | Glueck et al. |
| 9,448,758 | B2 | 9/2016 | Georgeson et al. |
| 9,582,692 | B2 | 2/2017 | Mitchell et al. |
| 9,646,187 | B2 | 5/2017 | Troy et al. |
| 9,881,192 | B2 | 1/2018 | Troy et al. |
| 10,380,469 | B2 | 8/2019 | Troy et al. |
| 2002/0052709 | A1 | 5/2002 | Akatsuka et al. |
| 2002/0069001 | A1 | 6/2002 | Sinex |
| 2005/0035980 | A1 | 2/2005 | Lonsing |
| 2007/0010923 | A1 | 1/2007 | Rouyre |
| 2009/0030544 | A1 | 1/2009 | Floeder et al. |
| 2009/0086027 | A1 | 4/2009 | Chaykin et al. |
| 2009/0086199 | A1 | 4/2009 | Troy et al. |
| 2009/0319544 | A1 | 12/2009 | Griffin et al. |
| 2010/0102980 | A1 | 4/2010 | Troy et al. |
| 2010/0135534 | A1 | 6/2010 | Weston et al. |
| 2011/0096148 | A1 | 4/2011 | Stratmann |
| 2011/0268322 | A1 | 11/2011 | Clausen et al. |
| 2012/0082383 | A1 | 4/2012 | Kruglick |
| 2012/0130257 | A1 | 5/2012 | Heanue et al. |
| 2012/0218300 | A1 | 8/2012 | Hayakawa |
| 2012/0229842 | A1 | 9/2012 | Groves |
| 2015/0356789 | A1* | 12/2015 | Komatsu .................. G06T 7/74 345/633 |
| 2016/0189383 | A1 | 6/2016 | Wang et al. |

OTHER PUBLICATIONS

Siltanen, "Theory and applications of marker-based augmented reality", VTT Science 3, VTT Technical Research Centre of Finland, 2012.

* cited by examiner

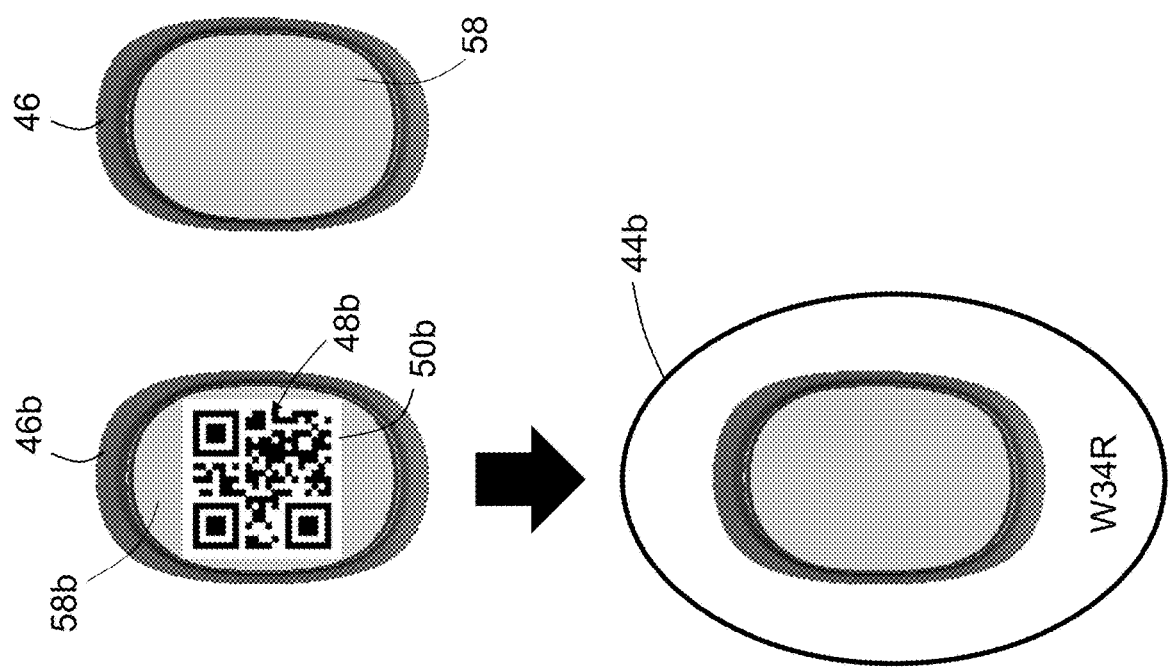
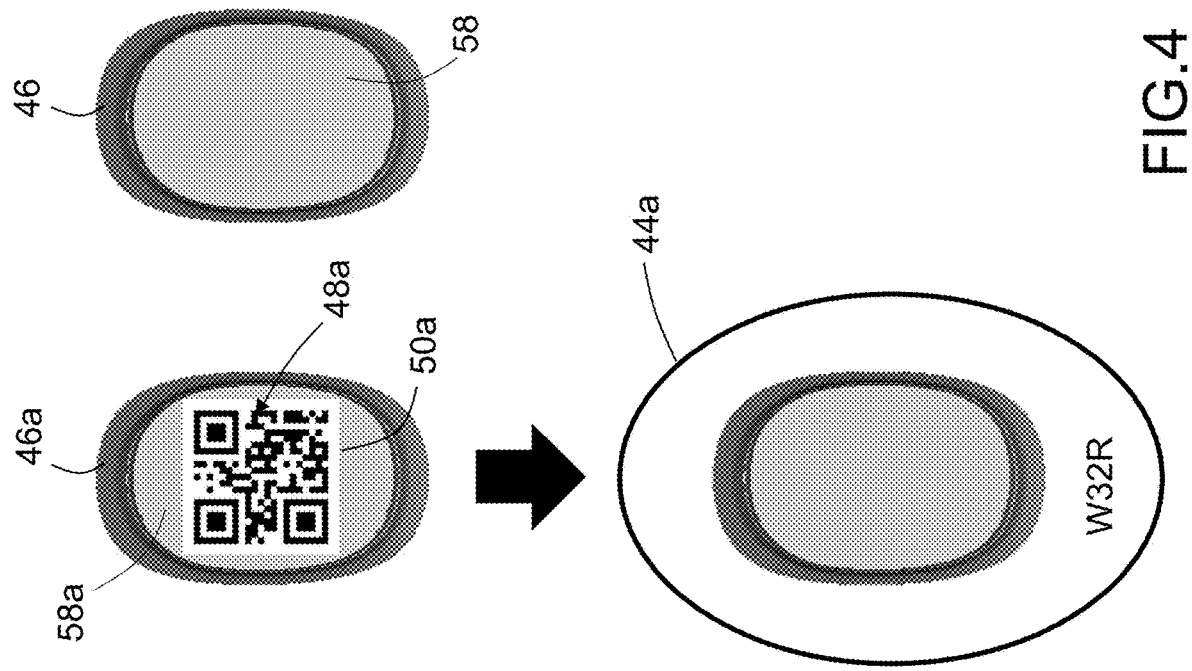
FIG.4

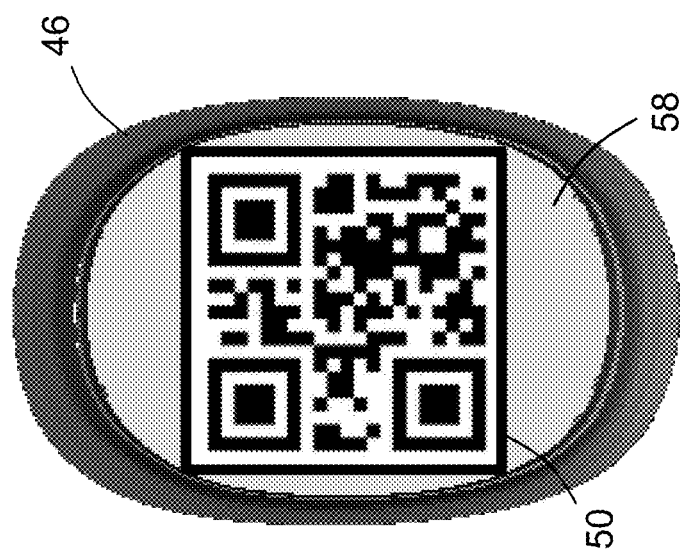
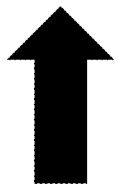
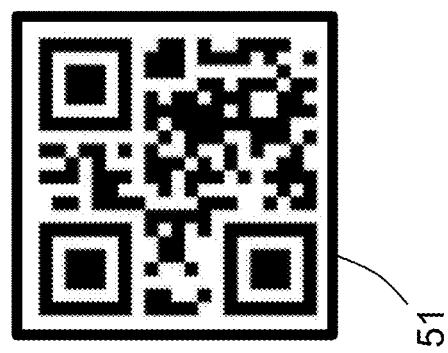
FIG. 14

MARKER-TO-MODEL LOCATION PAIRING AND REGISTRATION FOR AUGMENTED REALITY APPLICATIONS

BACKGROUND

This disclosure generally relates to systems and methods for calibrating augmented reality devices.

Augmented Reality (AR) is an interactive experience of a real-world environment wherein the objects that reside in the real world are enhanced by computer-generated content and computer-processed sensory input. Augmented reality devices allow users to observe a real-world view while simultaneously viewing virtual content that is superimposed on and aligned with items, images, objects or environments in the field of view of the AR device or user. The virtual content may include computer-generated imagery that is superimposed on a real-world view. Typical AR devices rely on sensors which are calibrated. If the sensors are not accurately calibrated, then the virtual content may appear misaligned with the real content.

Current AR systems often have difficulty acquiring accurate three-dimensional (3-D) position information of the AR device relative to the physical environment in which the device is being used. The problems include: (1) position drift over time; (2) failure to obtain position information in areas with few features; and (3) failure to obtain correct position information in areas with repetitive features. Many AR systems use camera-based methods to provide localization information of visible features in the physical environment, but in some environments—specifically manufacturing-related use cases—the current level of AR system 3-D localization accuracy is not sufficient to meet performance requirements.

SUMMARY

The subject matter disclosed in detail below is directed to systems, methods and devices for providing just-in-time access to data for calibrating an augmented reality (AR) device relative to an operation environment and then using the calibration data to register virtual content generated by the AR device with a scene being viewed by a user in an operation environment. A landmark-based reference system that uses two-dimensional (2-D) markers as location references that are mapped to a three-dimensional (3-D) physical coordinate system defined for a specific target object (e.g., an airplane) for AR applications. Passive 2-D machine-readable code patterns on 2-D markers (e.g., tags with symbols printed in patterns) are used as location landmarks to provide on-demand 3-D location information to the user.

As used herein, the term "location" comprises position in a fixed three-dimensional coordinate system and orientation relative to that coordinate system. As used herein, a "physical coordinate system" is one whose coordinates are ratio data scale and the space it defines is physical. As used herein, a "landmark-based reference system" is one whose coordinates are ordinal data scale and the space it defines may be abstract. As used herein, the term "3-D visualization environment" means a 3-D display application running on a computer that renders 3-D content and displays it on a display device. The display system may be selected from at least one of a display device, a computer monitor, glasses, a head-mounted display, a tablet computer, a mobile phone, a smartphone, a wrist-mounted display, a projector, a head-mounted display (HMD), a holographic display system, a retinal display, or some other suitable display device.

In accordance with one embodiment, the method includes calibrating an AR device by pairing marker identifiers of 2-D markers affixed to objects in a physical environment with 3-D locations of those objects specified in 3-D model of those objects and then generating a marker-to-model location pairing list that associates the respective marker identifiers with respective 3-D locations of objects. The method further includes using the pairing list to align displayed virtual content with an object appearing in the visualized physical environment. A location correction is derived at run-time based on a current AR device-to-marker offset derived from an image of the 2-D marker and the 3-D location of the object retrieved from the pairing list.

This disclosure describes steps for implementing the concept of using passive 2-D markers for 3-D localization and/or 3-D localization correction (hereinafter collectively referred to as "3-D localization") in AR applications. More specifically, this disclosure describes a method for improving AR system location estimates for applications that require improved 3-D positioning accuracy, such as building airplanes. The method proposed herein includes setting up the physical environment, acquiring reference location data from 3-D models of objects, and using the 3-D location data at run-time to correct the location estimate of the existing localization process of the AR device. The innovative features of the method include: (1) a process for setting up the physical environment and acquiring the calibration data; and (2) a process for associating the 2-D markers with known 3-D locations of the objects to which the markers are affixed, using the associations to generate true location information and applying a location correction at run-time based on the current estimated location of the AR device and the 3-D location of an object appearing in the scene being viewed.

Although various embodiments of systems, methods and devices for registering virtual content generated by an augmented reality (AR) application with a scene being viewed by a user in an operation environment are described in some detail later herein, one or more of those embodiments may be characterized by one or more of the following aspects.

One aspect of the subject matter disclosed in detail below is a method for providing just-in-time access to data for calibrating an AR device relative to an operation environment, the method comprising: (a) creating a multiplicity of 2-D machine-readable code patterns on respective 2-D markers using first symbology representing marker identifiers uniquely identifying the respective 2-D markers and second symbology representing registration marks; (b) applying the respective 2-D markers to selected locations on respective objects in a physical environment; (c) capturing image data representing the respective 2-D markers in the physical environment; (d) processing the image data to acquire digital data representing the respective marker identifiers; (e) loading properly located 3-D models representing the respective physical objects into a 3-D visualization environment; (f) acquiring digital data from the 3-D virtual environment representing 3-D locations of the respective objects from the 3-D models on which the 2-D machine-readable code patterns are attached; (g) pairing the marker identifiers of the respective 2-D markers with 3-D locations of the respective objects from the 3-D models; (h) generating a data file containing pairing list data representing a list of pairings of the marker identifiers and 3-D locations for run-time usage; and (i) converting the pairing list data into a form suitable for just-in-time loading onto AR devices. In one proposed implementation, the 2-D machine-readable code patterns are QR codes, the physical environment is an airplane and the objects are windows of the airplane.

In accordance with one embodiment of the method described in the immediately preceding paragraph, the method further comprises: (j) loading the pairing list data in an AR device; (k) loading virtual content in the AR device, the virtual content including a virtual feature of an object on which a 2-D marker is applied; (l) viewing the object in the physical environment on the AR device; (m) capturing image data representing the 2-D marker applied on the object; (n) processing the image data to acquire data representing the marker identifier and spatial positions of the registration marks of the 2-D marker applied on the object; (o) processing the spatial positions of the registration marks to calculate a current AR device-to-marker offset; (p) finding in the list of pairings a 3-D location of the object associated with the marker identifier of the 2-D marker; (q) calculating a 3-D location of the AR device in a frame of reference of the physical environment based on the current AR device-to-marker offset and the 3-D location of the object found in the list of pairings; and (r) displaying the virtual content with a viewpoint based on the current AR device-to-marker offset and the 3-D location of the object found in the list of pairings. In accordance with one embodiment, step (i) comprises creating a 2-D machine-readable code pattern on a 2-D marker using symbology representing the pairing list data and attaching the 2-D marker to a structure in the physical environment; and step (j) comprises optically reading the 2-D machine-readable code pattern to acquire the pairing list data and storing the acquired pairing list data in a non-transitory tangible computer-readable storage medium of the AR device. In accordance with another embodiment, step (i) comprises formatting the pairing list data for wireless transmission and then transmitting short-wavelength ultra-high-frequency radio waves modulated with information representing the pairing list data; and step (j) comprises receiving the electromagnetic waves, demodulating the received electromagnetic waves to acquire the pairing list data and storing the pairing list data in a non-transitory tangible computer-readable storage medium of the AR device.

Another aspect of the subject matter disclosed in detail below is a method for registering virtual content generated by an augmented reality application with a scene being viewed by a user in an operation environment, the method comprising: (a) creating a multiplicity of 2-D machine-readable code patterns on respective 2-D markers using first symbology representing marker identifiers uniquely identifying the respective 2-D markers and second symbology representing registration marks; (b) applying the respective 2-D markers to selected locations on respective objects in a physical environment; (c) loading pairing list data in an AR device, wherein the pairing list data represents pairings of marker identifiers on respective 2-D markers with 3-D locations of respective objects on which the 2-D markers are applied; (d) loading virtual content in the AR device, the virtual content including a virtual feature of an object having a 2-D marker applied thereon; (e) viewing the object in the physical environment on the AR device; (f) capturing image data representing the 2-D marker applied on the object; (g) processing the image data to acquire data representing the marker identifier and spatial positions of the registration marks of the 2-D marker applied on the object; (h) processing the spatial positions of the registration marks to calculate a current AR device-to-marker offset; (i) finding in the list of pairings a 3-D location of the object associated with the marker identifier of the 2-D marker; (j) calculating a 3-D location of the AR device in a frame of reference of the physical environment based on the current AR device-to-marker offset and the 3-D location of the object found in the list of pairings; and (k) displaying the virtual content with a viewpoint based on the current AR device-to-marker offset and the 3-D location of the object found in the list of pairings.

A further aspect of the subject matter disclosed in detail below is an AR device comprising an imaging device, a display device, a non-transitory tangible computer-readable storage medium, and a computer system communicatively coupled to the imaging device, display device, and non-transitory tangible computer-readable storage medium, wherein: the non-transitory tangible computer-readable storage medium stores pairing list data representing pairings of marker identifiers on 2-D markers with 3-D locations of objects in a physical environment on which respective 2-D markers are applied and virtual content data representing virtual content including virtual features of objects having respective 2-D markers applied thereon; and the computer system is configured to perform the following operations: (a) processing image data from an image captured by the imaging device to acquire data representing the marker identifier and spatial positions of the registration marks of a 2-D marker applied on an object which appears in the captured image; (b) processing the spatial positions of the registration marks to calculate a current AR device-to-marker offset; (c) finding in the list of pairings stored in the non-transitory tangible computer-readable storage medium a 3-D location of the object associated with the marker identifier of the 2-D marker which appears in the captured image; (d) calculating a 3-D location of the AR device in a frame of reference of the physical environment based on the current AR device-to-marker offset and the 3-D location of the object found in the list of pairings; and (e) displaying virtual content including a virtual feature of the object with a viewpoint based on the current AR device-to-marker offset and the 3-D location of the object.

Other aspects of systems, methods and devices for registering virtual content generated by an AR application with a scene being viewed by a user in an operation environment are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 4 is a diagram representing pairing and registration of 2-D markers (e.g., QR code pattern markers) and 3-D models of objects (e.g., airplane windows) for augmented reality applications.

FIG. 14 is a diagram representing the superposition of virtual content in the form of a texture map representing a code pattern on a view of a 2-D marker having that code pattern printed thereon.

Reference will hereinafter be made to the drawings in which similar elements in different drawings bear the same reference numerals.

DETAILED DESCRIPTION

Figure 1:
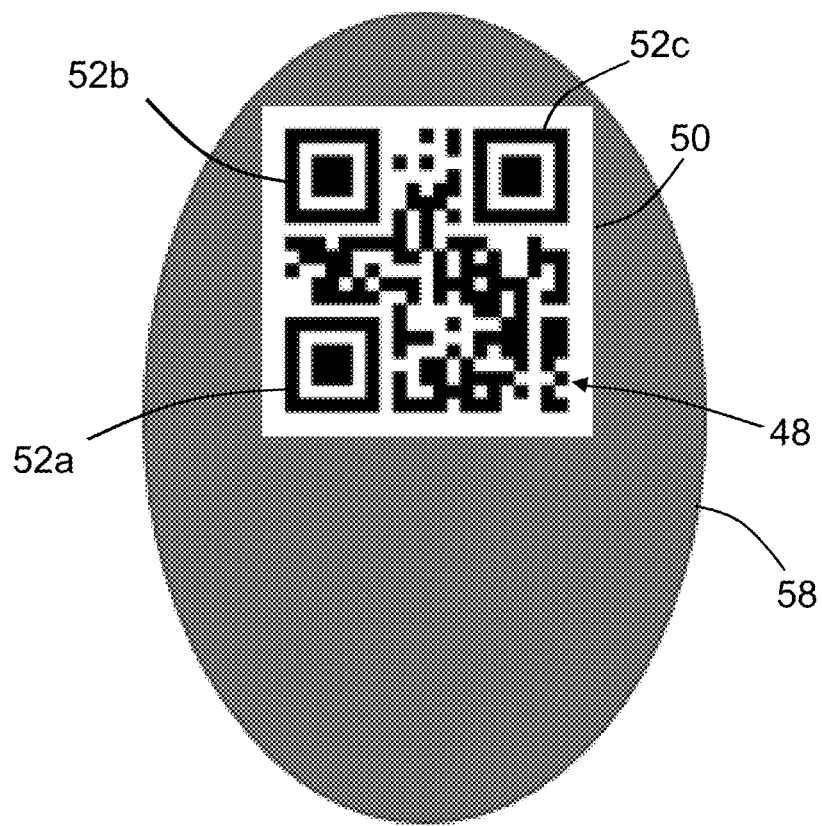
FIG. 1 is a diagram representing a QR code pattern marker adhered to a window.

Illustrative embodiments of systems, methods and devices for registering virtual content generated by an augmented reality (AR) application with a scene being viewed by a user in an operation environment are described in some detail below. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

For the purpose of illustration, methods for calibrating an AR device to enable accurate alignment of displayed virtual content with viewed objects in a physical environment inside an airplane will be described in detail below. However, the calibration and alignment processes disclosed herein may also be used for AR applications for target objects other than airplanes.

An airplane fuselage is one example of a structure or object on which the present embodiments may be used. Typically a fuselage is designed using a detailed Computer Aided Design (CAD) system, which is used to create virtual environments consisting of 3-D models of the structure in which items are defined with respect to a common Cartesian coordinate system. That coordinate system may then be applied as a reference coordinate system for determining the absolute position of any element of the structure contained in a 3-D model database. The CAD system may be used to create content for the 3-D model database, which is then maintained and available for reference in evaluations of ongoing inspection and maintenance of the airplane. The 3-D model database provides a coordinate system and exact geometrical information interrelated to that coordinate system associated with the entire structure and all components contained therein. As maintenance is performed, information regarding repairs or other maintenance procedures may be stored with respect to this reference coordinate system in a maintenance and/or other database which is also keyed to the reference coordinate system. While a 3-D model database is employed for the example embodiments, any system which establishes a reference for absolute position to a common coordinate system may be employed.

An airplane has numerous features which may be associated to the same features in the CAD database. This one-to-one mapping (hereinafter "landmark-to-location map") between the physical positions of features on the real object and the Cartesian coordinates from measurements of the virtual model enables a process for tracking the motion of imaging devices in the physical environment.

The subject matter disclosed in detail below is directed to systems and methods for calibrating an AR device by pairing encoded two-dimensional (2-D) markers affixed in a physical environment with 3-D models of objects in that physical environment and then aligning displayed virtual content with a viewed object in the physical environment using those pairings. A landmark-based reference system that uses 2-D markers as landmarks is mapped to a 3-D physical coordinate system defined for a specific target object (e.g., an airplane) for AR applications. Passive encoded 2-D markers (e.g., tags with printed code patterns) are used as location landmarks to provide on-demand 3-D location information to the user.

This disclosure describes steps for implementing the concept of using 2-D markers for 3-D localization in AR applications. More specifically, this disclosure describes a method for improving AR system location estimates for applications that require improved 3-D positioning accuracy, such as building airplanes. The method proposed herein includes setting up the physical environment, acquiring reference location data from 3-D models of objects, and using the 3-D location data at run-time to correct the location estimate of the existing localization process of the AR device. The innovative features of the method include: (1) a process for setting up the physical environment and acquiring the calibration data; and (2) a process for associating the 2-D markers with known 3-D locations of the objects to which the markers are affixed, using the associations to generate true location information and applying a location correction at run-time based on the current estimated location of the AR device and the 3-D location of an object appearing in the scene being viewed.

Passive 2-D markers are used as location landmarks to provide on-demand 3-D location information to the user in a landmark-based reference system that can then be mapped to the underlying 3-D physical coordinate system defined for the specific target object (e.g., an airplane). In accordance with the methods disclosed herein, the passive 2-D markers are in the form of attachable labels, such as adhesive-backed labels with printed text and a machine-readable data storage capability. The labels are applied to respective distinct locations on the target object (e.g., on some of the windows of an airplane, even if the labels are not at exactly the same place on each window).

The machine-readable data storage capability preferably takes the form of 2-D code patterns. As used herein, the term "code pattern" means a system of symbols representing machine-readable data. In accordance with various embodiments, the code patterns comprise arrays of pixel-like elements in a pattern that is decoded by the scanning algorithm. Examples of suitable commercially available 2-D code patterns include the following: bar codes, Quick Response (QR) codes, Data Matrix codes, Aztec codes and MaxiCode.

The methods disclosed herein provide a way for users to quickly, easily and inexpensively instrument an environment with location landmarks (e.g., labels or markers with printed code patterns) that can be used later to give both discrete and continuous on-demand location tracking at a level of resolution dictated by the landmark spacing or density in the environment for use by an AR application. The location landmarks are designed to be quickly and easily set up and later removed.

In accordance with some of the embodiments disclosed herein, the locations of the landmarks exist in a landmark-based reference system defined by the user in terms of unique descriptions that in some use cases may be meaningful to the user (e.g., "left window at row 1", "forward lavatory", etc.). These locations can then be mapped into an underlying physical 3-D coordinate system that gives more precise Cartesian x, y, z coordinates that can be used by other tools to determine a location of an imaging device (e.g., a hand-held scanner or a camera integrated in a head-mounted display). For example, an AR device may be configured to receive viewpoint information (e.g., a location of a virtual camera) from an integrated camera in relation to a plurality of landmarks having known coordinates in the frame of reference of the target object and, based on that user viewpoint information, set a viewpoint so that virtual content concurrently generated by the AR application is aligned/registered with the scene being viewed by the user in the physical world (e.g., inside an airplane) at that moment in time.

As used herein, the term "viewpoint" is the apparent distance and direction from which a camera views and records an object. An AR device allows a user to display virtual content from a viewpoint that can be characterized as the apparent location of a virtual camera. As used herein, the term "location" includes both position (e.g., x, y, z coordinates) and orientation (e.g., look direction vector of a virtual line-of-sight).

The AR device calibration process proposed herein uses landmarks in the form of 2-D markers having code patterns printed on a substrate, which substrate is affixed to physical objects of known locations in a physical environment. One example of suitable commercially available code patterns are QR codes. QR codes are a type of 2-D barcode (a.k.a. matrix barcode) which has integrated registration fiducial symbols (a.k.a. registration marks). FIG. 1 is a diagram representing a QR code pattern marker 50 adhered to a window 58. The QR code pattern marker 50 comprises a flexible substrate having a QR code pattern 48 printed thereon. The QR code pattern 48 comprises a payload consisting of data that identifies which window 58 the QR code pattern marker 50 is adhered to. In addition, the QR code pattern 48 comprises a registration fiducial symbol 52a in a lower left-hand corner of the code pattern, a registration fiducial symbol 52b in an upper left-hand corner of the code pattern, and a registration fiducial symbol 52c in an upper right-hand corner of the code pattern, which are used to track the location of the AR device (not shown in FIG. 1).

As mentioned above, during run-time usage the absolute position coordinates of the AR device/camera defined in the frame of reference of the physical environment (e.g., an airplane) may be calculated using the current AR device-to-marker offset and the 3-D location of the object to which the marker is affixed in the frame of reference of the physical environment. 4×4 homogeneous transformation matrices are used to define the spatial location (position and orientation) of one specific frame of reference relative to another specific frame of reference. A sequence of 4×4 homogeneous transformation matrix multiplications can be used to convert between coordinate systems.

Using a 3-D model of the object (e.g. a window of an airplane) to which the QR code is affixed (e.g., adhered) and which has a location defined in the frame of reference of the physical environment (e.g., an airplane), the 3-D location of the QR code in the frame of reference of the physical environment is acquired. The location of the camera (which is part of the AR device) relative to the QR code (the AR device-to marker offset) is then calculated using a QR code-based process that solves the camera pose problem. Then the location of the AR device/camera in the frame of reference of the physical environment (e.g., in airplane coordinates) is calculated using a transformation matrix equation.

Figure 2:
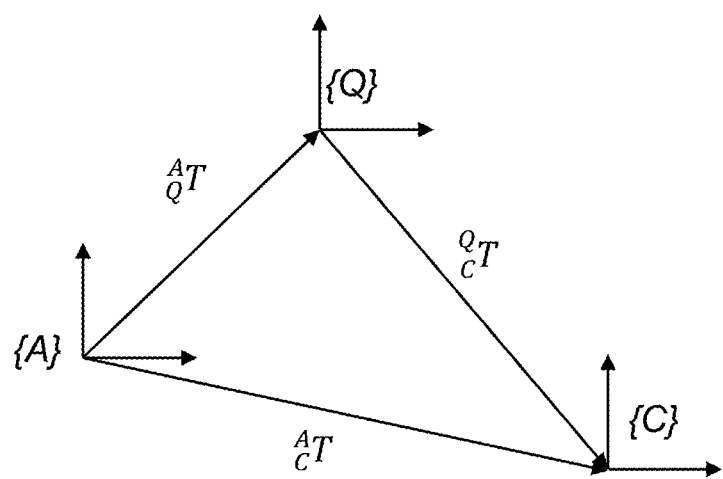
FIG. 2 is a coordinate system transformation diagram showing a transforming sequence for converting the location of an AR device from a marker frame of reference to the frame of reference of an airplane.

FIG. 2 is a coordinate system transformation diagram showing a transforming sequence for converting the location of an AR device/camera from the frame of reference of a QR code to the frame of reference of an airplane. The specific transforming sequence to convert the location of the AR device/camera from the QR code frame of reference to the airplane frame of reference is described by the equation:

$$^A_C T = {}^A_Q T \, {}^Q_C T$$

This equation computes the transformation matrix $$^A_C T$$

(which is the location of the AR device/camera defined in a frame of reference {C} relative to the frame of reference {A} of the airplane), as the product of the transformation matrix $$^A_Q T$$

(which is me location or me QR code defined in the frame of reference {Q} relative to the frame of reference {A} of the airplane), and the transformation matrix $$_{C}^{Q}T$$

(which is the location of the AR device/camera defined in the frame of reference {C} relative to the location of the QR code defined in the frame of reference {Q}). T is a 4×4 homogeneous transformation matrix, and the leading subscripts and superscripts are as follows: {C} is the frame of reference of the AR device/camera; {A} is the absolute frame of reference of the airplane; and {Q} is the frame of reference of the QR code.

Figure 3:
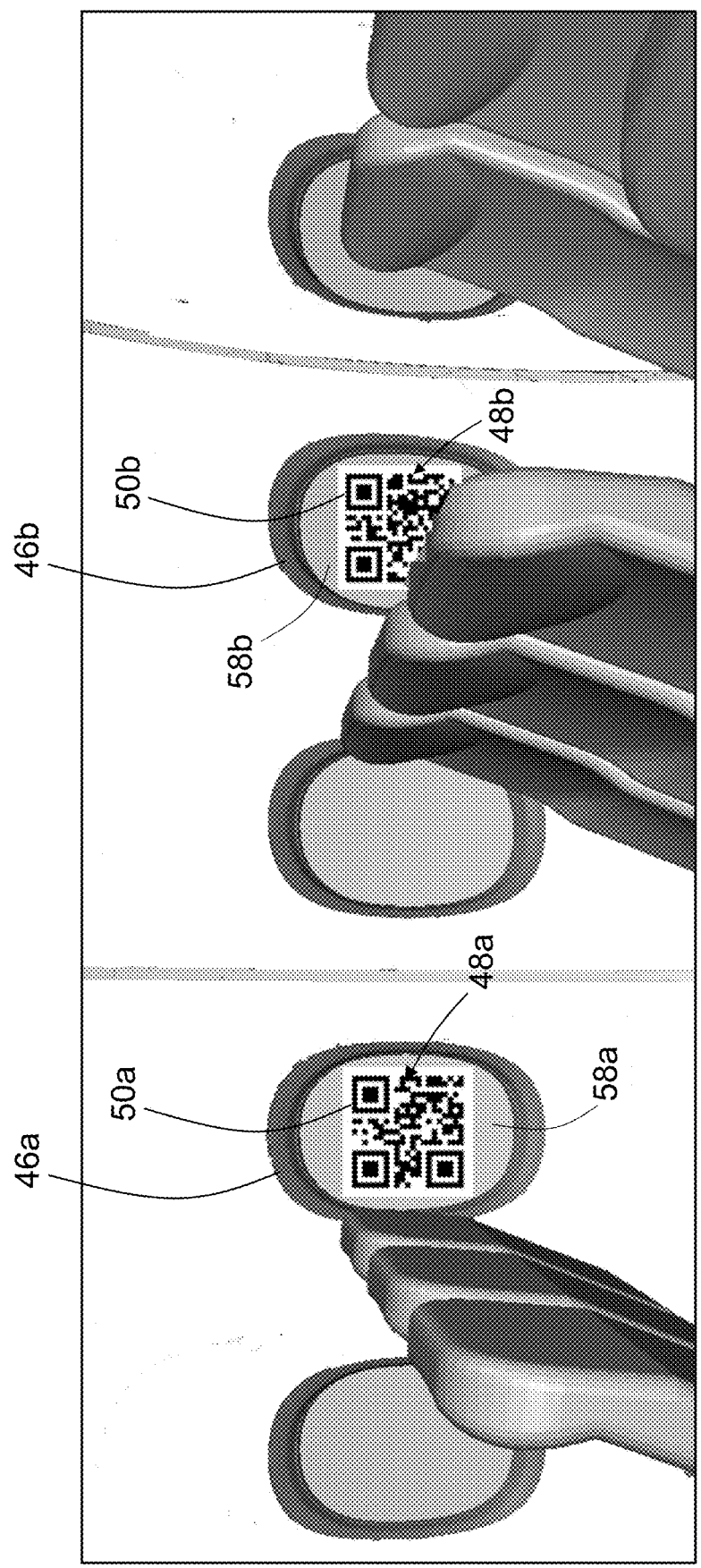
FIG. 3 is a diagram showing the use of markers (e.g., QR code pattern markers) adhered to windows inside the fuselage of an airplane.

FIG. 3 is a diagram showing the use of QR code pattern markers 50a and 50b inside an airplane fuselage. Each of the QR code pattern markers 50a and 50b comprises symbology (QR code patterns 48a and 48b) that encodes respective unique reference location identification data identifying the reference location where the QR code pattern has been placed. In addition, each QR code pattern 48a and 48b comprises a registration fiducial symbol in a lower left-hand corner of the code pattern, a registration fiducial symbol in an upper left-hand corner of the code pattern, and a registration fiducial symbol in an upper right-hand corner of the code pattern as described previously in FIG. 2. In the scenario depicted in FIG. 3, QR code pattern marker 50a is applied in the center of the top portion of a window 58a surrounded by a window frame 46a; QR code pattern marker 50b is applied in the center of the top portion of a window 58b surrounded by a window frame 46b. Each QR code pattern 48a and 48b is unique. The payload in each QR code pattern marker contains a unique identifier for a respective one of the windows. If desired, the QR code pattern markers 50a and 50b may be printed double-sided, so they are visible and usable from both the interior and the exterior of the airplane. The text on each marker indicates which row's window that marker should be installed on. If each window is covered by a protective film, then the associated code pattern marker can be applied to the film, and will then be removed much later in the assembly process along with the film without significant risk of leaving foreign objects in the airplane. In some embodiments the marker pattern may be printed on or within the protective film itself.

The QR code patterns 48a and 48b contain registration marks, such as fiducial symbols 52a-52b, of known size and orientation, which permits a small amount of continuous relative position and orientation tracking when the QR code pattern marker is completely within the field-of-view of a handheld imaging device capable of continuous scanning (e.g., a video camera). If more than one QR code pattern marker is in the field-of-view of the camera, then it is possible to interpolate position between two QR code pattern markers, which enables continuous scanning over larger regions. The steps of scanning a QR code pattern marker and using the logical coordinates returned can be repeated as often as needed. Once this process is complete, the set of QR code pattern markers can be removed at that time, or they can be left onboard to be reused until the window protective films themselves are removed later in the assembly process.

In the embodiments disclosed herein, QR code patterns are preferred because the registration marks are integrated into the format, and since QR code patterns are a standard type available in commercially available off-the-shelf products, which makes it more convenient for users to print the labels. However, alternative code patterns that do not have integrated registration marks may be employed. Data Matrix code, MaxiCode, Aztec code, and other types of 2-D barcode can be used if the continuous relative location tracking aspect of the concept is not needed or if it is a separate part of the label.

In accordance with alternative embodiments, a separate registration mark template (i.e., background image) can be added to a code pattern that lacks integrated registration marks. The code pattern can be placed within the blank space between the registration marks to provide equivalent continuous tracking functionality to what can be achieved using QR codes. Any source that supplies machine readable landmark-based reference data may be employed such as UPC standard barcodes, Data Matrix (ECC 200) 2-D matrix barcodes, or MaxiCode 2-D matrix barcodes (used by UPS, public domain). As with the QR code pattern example, these alternate forms of discrete data storage can be used along with relative motion tracking to provide continuous tracking in an absolute coordinate system.

FIG. 4 is a diagram representing pairing and registration of 2-D markers (e.g., QR code pattern markers 50a and 50b) and 3-D models 44a and 44b of objects (e.g., airplane windows) for augmented reality (AR) applications. In this example, windows 58a and 58b have respective QR code pattern markers 50a and 50b adhered (affixed) thereto; windows 58 do not have markers. The payload of each QR code pattern marker 50a and 50b includes encoded data uniquely identifying the marker. In the example depicted in FIG. 4, the QR code pattern marker 50a is uniquely identified by the reference "W32R", while the QR code pattern marker 50b is uniquely identified by the reference "W34R".

During set-up, the QR code pattern markers 50a and 50b markers are scanned and read by the system. The markers may be scanned using a separate hand-held scanner or an imaging device (e.g., a camera) integrated with the AR device. The markers are read by processing the image data to extract the marker identifiers. Before or after the markers are scanned, the 3-D models 44a and 44b are loaded into a 3-D visualization environment for use during the pairing and registration procedure. Then the respective marker identifiers are associated (in a pairing list) with the respective locations of the physical objects represented by respective 3-D models. A data file containing a list of the pairings of the marker identifiers and locations of the objects represented by the 3-D models is generated and saved (in a non-transitory tangible computer-readable storage medium) for run-time usage. For example, the pairing list may be in the form of a look-up table.

More generally, the technology disclosed herein includes a process for pairing two forms of acquired data: the unique alphanumeric payload of a 2-D marker and the corresponding 3-D location data specifying the location of that 2-D marker in a frame of reference of a physical environment (e.g., inside an airplane). The 2-D markers are placed throughout the physical environment and are associated with the corresponding 3-D locations to build a pairing table during the initial set-up phase. This set-up phase involves the use of a 3-D model of the physical environment that can be queried by the user to acquire a specific 3-D location on a target object, and the 2-D markers (e.g., matrix barcodes such as QR codes) are read by a scanner (or by a camera and image processing application) to acquire the unique identifier payload that is encoded in the 2-D marker. These two pieces of information are associated together in the pairing table, and then the user continues with the acquisition process to acquire the next pair, and so forth. When this data acquisition process is complete, the pairing table is saved and can be converted into another machine-readable form (e.g., another matrix barcode such as a QR code or other electronic form) that is accessible to the users. The pairing table will be scanned by the user's AR device at the start of run-time usage. Since the usage of the system is decentralized, multiple independent instances of the run-time application(s) can be used simultaneously.

Figure 5:
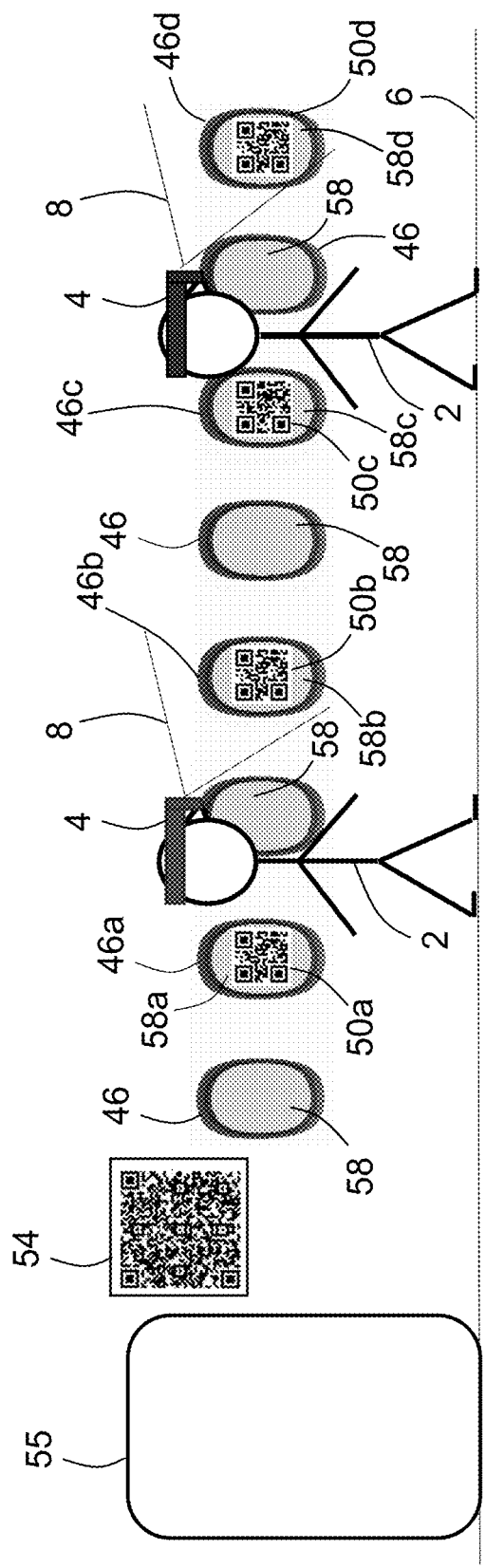
FIG. 5 is a diagram representing run-time use of an augmented reality system configured for correcting internal 3-D location estimates using 2-D markers affixed to windows inside an airplane and a 2-D marker-to-3-D object model pairing list (hereinafter "marker-to-model location pairing list").

In accordance with some embodiments, the unique marker-to-model location pairing list may be read automatically by the imaging device integrated with the AR device as the user (or autonomous agent in the case of robotic applications) enters the physical environment. For example, FIG. 5 shows a scenario after the initial set-up and after a user has entered an aircraft via a doorway 55 and is walking down an aisle. A QR code pattern marker having a landmark-to-location map 54 printed thereon is placed near the doorway during set-up and is used to retrieve the associated physical airplane coordinates of detected markers in the airplane coordinate system. These physical airplane coordinates can then be fed into the AR application to set the position and orientation of virtual content displayed by the AR device to align with the physical objects being viewed by the user during run-time. In accordance with other embodiments, the user (or agent) decides when to scan the pairing list. In some embodiments, the 3-D locations may include both the position and orientation (such as the selected surface position having x,y,z coordinates and the orientation of the surface normal at that position). In other embodiments, only the x,y,z coordinates might be needed.

After the initial set-up, the AR application involves scanning the physical environment for the 2-D markers, looking up the corresponding 3-D location associated with the 2-D marker at run-time, applying that 3-D location to the current AR device-to-marker offset and then correcting the AR system's internal 3-D location estimate. The AR system is able to support multiple simultaneous users and is not restricted to using the hardware of any particular manufacturer.

FIG. 5 is a diagram representing run-time use of an AR system configured for correcting internal 3-D location estimates using 2-D markers affixed to windows inside an airplane and a marker-to-model location pairing list. In the example depicted in FIG. 5, the 2-D markers include QR code pattern markers 50*a*-50*f* affixed to windows 58*a*-58*f* respectively; some windows 58 do not have 2-D markers. Windows 58*a*-58*f* are respectively surrounded by window frames 46*a*-46*f*. If multiple readable markers are within view, the localization algorithm selects the closer of the markers, and if no fully readable markers are within view (which may include markers that are too obscured to read), the method does not provide a location correction to the AR system.

FIG. 5 shows two users 2 walking on the floor 6 of an airplane cabin. Each user 2 is wearing a respective head-mounted display 4 which is part of an AR device. The head-mounted display 4 is configured to place images of both the physical world and virtual objects in the user's field-of-view 8. At least one camera (not shown in FIG. 5) is mounted to or contained within each of the head-mounted display 4 devices. In this figure one of the cameras faces forward for each device with a respective field-of-view 8 indicated by two dashed lines in FIG. 5. The camera is used to capture images of the QR code pattern markers 50*a*-50*f*, which images are then processed to compute the location data needed to align the virtual content being displayed on the head-mounted display 4 with the scene being viewed by the user.

One type of wearable AR device is sometimes called a see-through AR device, where the user wears a head-mounted display and sees light from the real world as well as light from a computer-generated virtual environment. There are other forms of AR that use image data from a camera with computer-generated content as an overlay on that camera image data. The technology proposed herein is applicable to both forms of AR. The virtual content shown in these displays can be any form of computer-generated data. Some virtual content may be 3-D solid models (such as 3-D CAD models); other forms may be 3-D lines, texture maps, or even text placed at the proper 3-D location. Not all hardware is capable of rendering complex 3-D solid models (hereinafter "3-D models") and others may only be able to render a limited amount of 3-D geometry. In addition, in some cases, rendering a simpler representation may be better than having a full 3-D model. In all cases, the computer-generated data (whether 3-D models or other virtual content) still needs to be properly placed (located) in the 3-D physical environment (position and orientation), which is the core element for physical-to-virtual world alignment. Although one intended usage of this system is for head-mounted display devices, other types of AR systems would also be able to use the technology disclosed herein.

The initial set-up process involves scanning the 2-D markers in the physical environment and associating (pairing) the 2-D markers with respective 3-D locations of physical objects that are part of the reference object, such as window frames onboard an airplane. Each window frame may be a separate object having a respective 2-D marker affixed thereto and each 3-D model of a window frame has specific respective 3-D location data which may be associated with the marker identifiers.

After or before the pairing list has been loaded into the AR device, the virtual 3-D content (e.g., 3-D models, 3-D lines, or other 3-D forms) relating to objects is also loaded into the AR device. In AR applications, usually a full CAD model is not used since some AR devices may not have sufficient rendering capability to show the full model. Some embodiments of the technology proposed herein involve showing reference 3-D content, such as a part of a window or a border around a window or the square outline of a QR code that is adhered to a window. Once the limited 3-D content has been properly aligned by the calibration process (physical-to-virtual world registration), the user sees the 3-D content as an overlay on the real world scene.

At the start of the set-up process, the 3-D virtual objects—e.g., 3-D solid models, 3-D line segments, or marker outlines defined in absolute (airplane) coordinates—are loaded into the virtual environment display application on the AR device, but the unique content of the payload of the marker (e.g., a matrix barcode such as a QR code) is not yet associated with the appropriate 3-D virtual object. Thereafter, each unique marker identifier is associated with a respective unique location (position and orientation) of a respective 3-D virtual object. The association of markers with locations enables the process to determine the relative location of the marker with respect to the virtual 3-D object that it is paired with, and then a computer may compute the absolute location of the marker in the frame of reference of the physical environment (e.g., airplane coordinates).

Using the AR device at run-time is a different process than how the AR device is used during the initial set-up process, which involves the initial pairing of the physical encoded 2-D markers to corresponding marker locations. The construction of the marker-to-model location pairing table is done once per airplane and then the pairing table may be used at run-time by any users that come onto that airplane and want to use their AR devices with the tracking correction system proposed herein.

Figure 6:
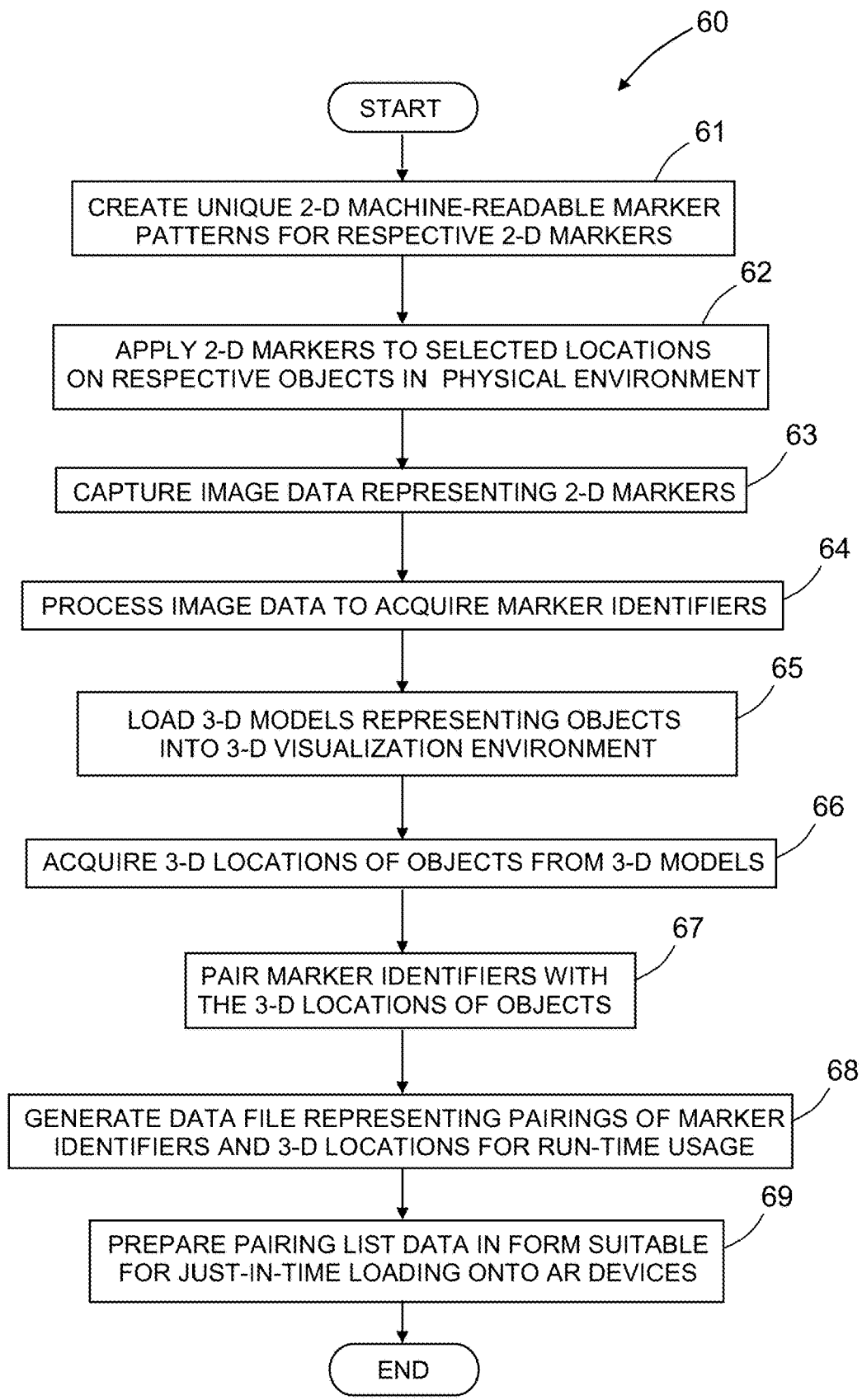
FIG. 6 is a flowchart identifying steps of a method for providing just-in-time access to data for calibrating an AR device relative to an operation environment in accordance with one embodiment.

FIG. 6 is a flowchart identifying steps of a method 60 for setting up and calibrating an AR system configured to scan 2-D markers placed on physical objects for the purpose of registering virtual content with an image of the physical environment in accordance with one embodiment. The initial set-up of the system in the target environment involves the following steps. First, a multiplicity of 2-D machine-readable code patterns are created on respective 2-D markers using first symbology representing marker identifiers uniquely identifying the respective 2-D markers and second symbology representing registration marks (step 61). Then the respective 2-D markers are applied to selected locations on respective objects in a physical environment (step 62). Following completion of marker installation, image data representing the respective 2-D markers in the physical environment is captured (step 63) using an imaging device (e.g., a handheld imaging device or an imaging device incorporated in an AR device). The image data is processed to acquire digital data representing the respective marker identifiers (step 64). Before or after the image data is acquired, 3-D models representing the respective objects to which the markers are affixed are loaded into a 3-D visualization environment (step 65) and displayed on a laptop or tablet computer. The user then acquires digital data representing the 3-D locations of the respective objects from the 3-D models (step 66). The user then instructs the application to pair each of the marker identifiers of the respective 2-D markers with the 3-D locations of the respective objects from the 3-D models (step 67). Upon completion of the pairing of marker identifiers with 3-D locations of associated objects, a data file containing pairing list data representing a list of pairings of the marker identifiers and 3-D locations is generated for run-time usage (step 68). Then the pairing list data is converted into a form suitable for just-in-time loading onto augmented reality (AR) devices (step 69), such as the example in FIG. 12.

The physical object (represented by a 3-D model) has known position coordinates in the frame of reference of the physical environment, which means that the coordinates of the collocated marker may also be determined by referring to the pairing list. Subsequently, the coordinates of the AR device in the frame of reference of the airplane may be calculated based on the marker coordinates and an AR device-to-marker offset that is measured as described below.

For initial set-up of the environment inside an airplane, the most efficient way to install the 2-D markers on the windows would be to have the window's original equipment manufacturer print the unique 2-D code patterns on the protective film that is placed on the window before delivery. But that would likely require a level of planning and perhaps changes at the window manufacturer that might not be practical. As a more realistic alternative, separate unique 2-D code pattern markers can be placed over the protective films after the windows are prepared by the original equipment manufacturer. The 2-D code pattern markers may be placed on the windows either before or after the windows are installed on the airplane.

Except for the loading of pairing list data on the AR device, the steps shown in FIG. 6 are environment preparation tasks that only happen once, while loading of the data into AR devices is an event that happens for individual users and may happen multiple times. The AR devices may be used on multiple airplanes (or multiple environments), rather than being assigned to one airplane. The users may be working on one specific airplane for an hour or so, and then move over to a different airplane, and then later onto another airplane (or perhaps back to the first one). Dozens of other workers with their own AR devices may need to load the data as well. The data preparation for one airplane will be used by many separate AR devices after the pairing list has been created.

After the initial set-up, an AR device may make use of the 2-D markers at run-time to enable accurate positioning of virtual content relative to the scene being viewed by the user of the AR device. The run-time process needs to be scalable so that set-up data from multiple environments (airplanes) can be easily applied to multiple devices—and in a just-in-time fashion (such as when the user walks onto the airplane). To achieve scalability, the pairing list data is prepared in such a way such that data may be easily uploaded onto the AR devices when the user walks into the environment. There are several methods in which such uploading may happen.

In accordance with one embodiment, step 69 comprises: creating a 2-D machine-readable code pattern on a 2-D marker using symbology representing the pairing list data; and attaching the 2-D marker to a structure in the physical environment. For example, the pairing list data may be encoded into a large QR code (or multiple QR codes) that are attached to a location near the entry door of the airplane. The users scan the set-up QR code(s) with the AR device when they walk onto the airplane to configure their AR device. This is an optical process using something like a printable QR code (but could also use something like an e-ink display).

In accordance with another embodiment, step 69 comprises: formatting the pairing list data for wireless transmission; and transmitting short-wavelength ultra-high-frequency radio waves modulated with information representing the pairing list data. For example, the pairing list data may be uploaded using a short-range local wireless transmission process (such as Bluetooth) that provides the pairing list data for a specific airplane, which is accessible once the user steps onto that airplane, but would not be accessible from other locations, such as on other airplanes, since mixing up the calibration data sets should be avoided. (Bluetooth is a wireless technology standard for exchanging data between fixed and mobile devices over short distances using short-wavelength UHF radio waves in the industrial, scientific and medical radio bands, from 2.400 to 2.485 GHz, and building personal area networks.)

Figure 7:
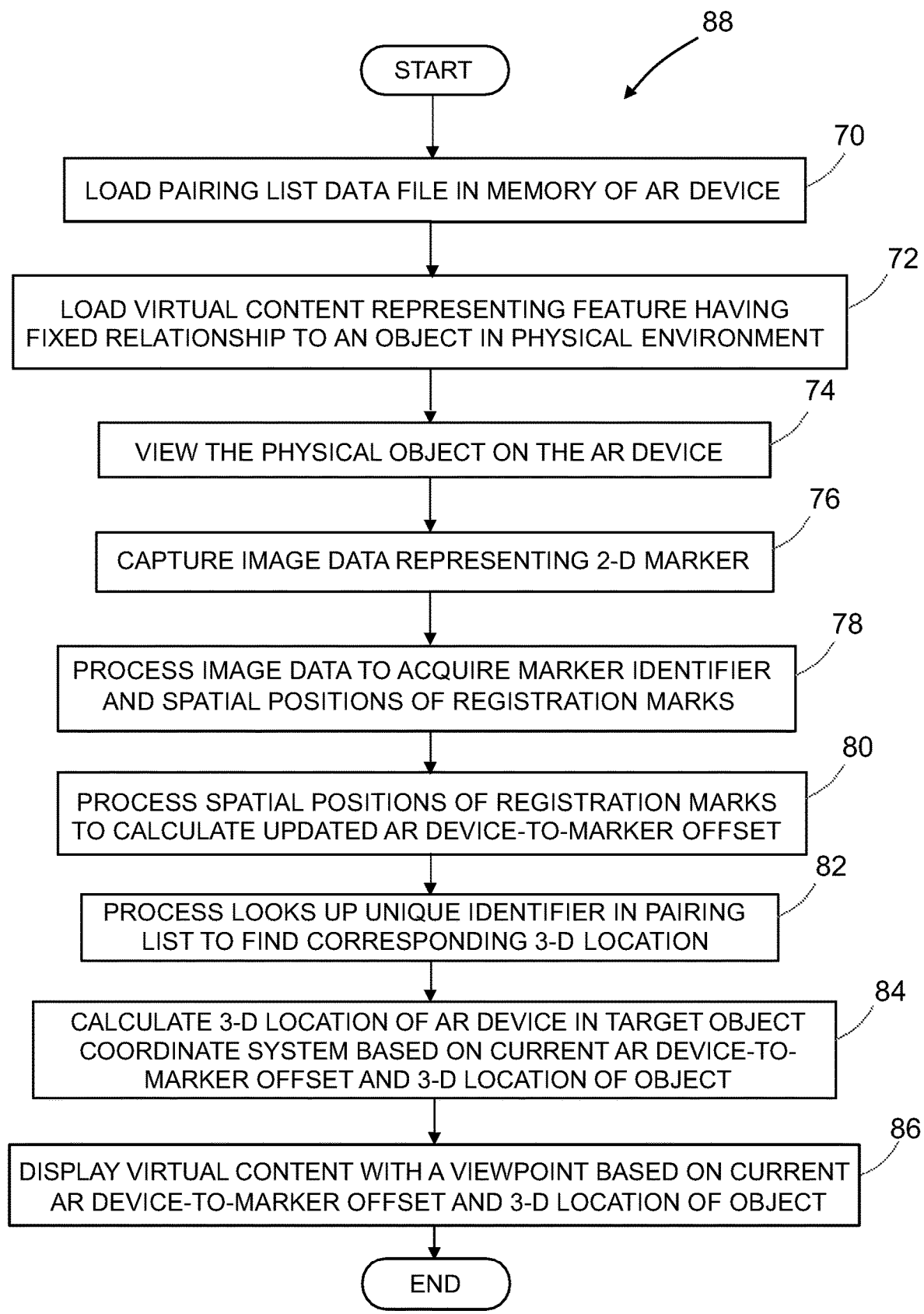
FIG. 7 is a flowchart identifying steps of a method for registering virtual content generated by an augmented reality application with a scene being viewed by a user in an operation environment in accordance with one embodiment.

FIG. 7 is a flowchart identifying steps of a method 88 for registering virtual content generated by an augmented reality application with a scene being viewed by a user in an operation environment in accordance with one embodiment. The method 88 for registering virtual content with a scene being viewed involves the following steps. The pairing list data is loaded in an AR device (step 70). Before or after step 70, virtual content including a virtual feature of an object having a 2-D marker applied thereon is loaded in the AR device (step 72). The virtual feature has a fixed relationship to the virtual object corresponding to the object in the physical environment. The object in the physical environment is then viewed on a display device incorporated in the AR device (step 74). In addition, image data representing the 2-D marker applied on the object is captured using an imaging device (e.g., a camera) incorporated in the AR device (step 76). The image data is processed to acquire data representing the marker identifier and data representing the spatial positions of the registration marks of the 2-D marker that is applied on the object (step 78). Then the spatial positions of the registration marks are processed to calculate a current AR device-to-marker offset (step 80). The process then searches the list of pairings and finds a 3-D location of the object associated with the marker identifier of the 2-D marker that is applied on the object (step 82). A 3-D location (e.g., the absolute position coordinates) of the AR device defined in a frame of reference of the physical environment (e.g., an airplane) is then calculated (step 84) based on the current AR device-to-marker offset and the 3-D location of the object (collocated with the marker) found in step 82. The virtual content is then displayed (step 86) with a viewpoint that is based on the current AR device-to-marker offset calculated in step 80 and the 3-D location found in step 82.

In accordance with one embodiment, step 69 (see FIG. 6) comprises: preparing pairing list data in a form suitable for just-in-time loading onto AR devices, e.g., creating a 2-D machine-readable code pattern on a 2-D marker using symbology representing the pairing list data, and attaching the 2-D marker to a structure in the physical environment. In accordance with another embodiment, step 70 (see FIG. 7) comprises optically reading the 2-D machine-readable code pattern to acquire the pairing list data and storing the acquired pairing list data in a non-transitory tangible computer-readable storage medium of the AR device.

In accordance with another embodiment, step 69 (see FIG. 6) comprises: formatting the pairing list data for wireless transmission, and transmitting short-wavelength ultra-high-frequency radio waves modulated with information representing the pairing list data; whereas step 70 (see FIG. 7) comprises receiving the electromagnetic waves, demodulating the received electromagnetic waves to acquire the pairing list data and storing the pairing list data in a non-transitory tangible computer-readable storage medium of the AR device.

Figure 8:
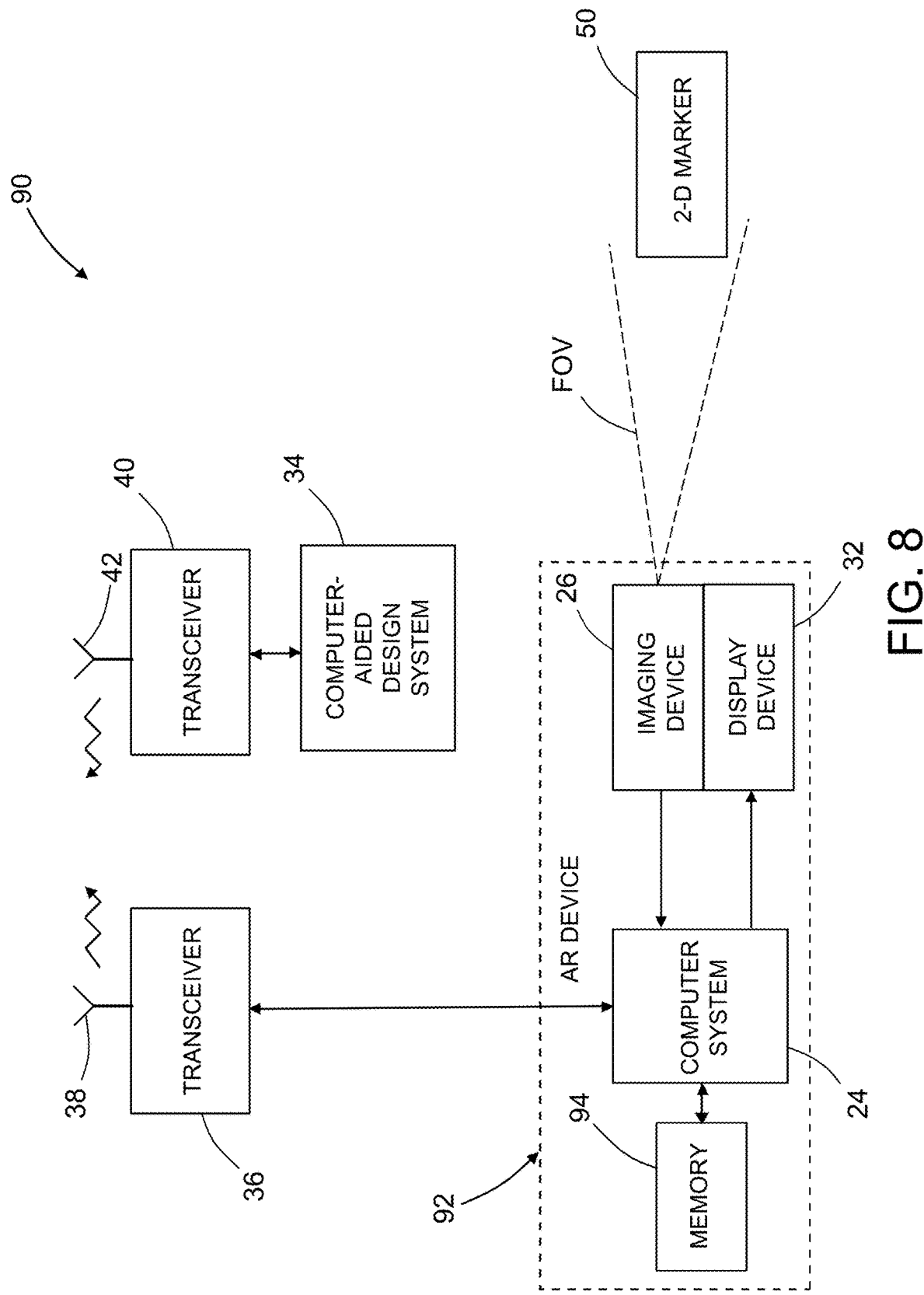
FIG. 8 is a block diagram identifying some components of an AR system capable of aligning a computer-generated virtual feature with a physical environment being viewed using 2-D markers as landmarks.

FIG. 8 is a block diagram identifying some components of an AR system 90 capable of correctly aligning a computer-generated virtual feature with a physical environment being viewed using 2-D markers as landmarks in accordance with one embodiment. The AR system 90 includes an AR device 92, a Computer-Aided Design (CAD) system 34 and one or more 2-D markers 50 affixed to respective objects in a physical environment. The CAD system 34 includes a database including CAD model data representing models of objects which are components of a reference object, such as an airplane. The CAD model data includes 3-D location data specifying the coordinates of the respective 3-D locations of the objects in the frame of reference of the target object (e.g., an airplane). The AR system further includes a transceiver 36 operatively coupled to the AR device 92 and a transceiver 40 operatively coupled to the CAD system 34. The transceivers 36 and 40 are wirelessly communicatively coupled by way of respective antennas 38 and 42. This communication path enables the AR device 92 to receive CAD model data from the CAD system 34.

The AR device 92 includes an imaging device 26 (e.g., a camera) having a field-of-view (FOV) that preferably encompasses the 2-D marker 50; a display device 32 (e.g., the head-mounted display 4 depicted in FIG. 5) capable of displaying virtual content on a transparent screen while a user views a physical scene; a non-transitory tangible computer-readable storage medium (e.g., memory 94); and a computer system 24 communicatively coupled to the imaging device 26, display device 32, and memory 94. The memory 94 stores pairing list data representing pairings of marker identifiers on 2-D markers 50 with 3-D locations of objects (not shown in FIG. 8) in a physical environment on which respective 2-D markers 50 are applied and virtual content data representing virtual content including virtual features of objects having respective 2-D markers 50 applied thereon.

The computer system 24 is configured to perform the following operations. Image data from an image captured by the imaging device 26 is processed to acquire data representing the marker identifier and spatial positions of the registration marks of a 2-D marker 50 applied on an object which appears in the captured image. The spatial positions of the registration marks are then processed to calculate a current AR device-to-marker offset. Then the computer system searches the list of pairings stored in memory 94 to find a 3-D location of the object associated with the marker identifier of the 2-D marker 50 which appears in the captured image. A 3-D location of the AR device 92 in a frame of reference of the physical environment is then calculated based on the current AR device-to-marker offset and the 3-D location of the object found in the list of pairings. The computer system then controls the display device 32 to display virtual content including a virtual feature of the object with a viewpoint based on the current AR device-to-marker offset and the 3-D location of the object. Optionally, the imaging device 26 of the AR device 92 may also be used during the set-up process In accordance with other embodiments, a separate code scanning device (shown in FIGS. 9A and 9B) may be used during set-up to acquire the digital marker codes used for the pairing step. The code scanning device may be a separate hand-held device. A hand-held device may be used during set-up, but would not be used for the run-time part. The hand-held device may be configured to associate the embedded unique identifier data (e.g. "AA123") of an encoded marker with geometry model data of the 3-D object (e.g., "w765.obj") and the associated spatial location of the 3-D object, which spatial location includes the position and orientation (e.g., a 4×4 transformation matrix or quaternion) of the 3-D object with respect to airplane coordinates.

If a hand-held device is used for associating markers and locations, that device may be configured to communicate with a computer system (not shown in FIG. 8) that is recording the pairing data. For example, the 3-D models may be loaded in and displayed in a 3-D virtual environment running on a laptop or tablet PC, with the hand-held device plugged into the laptop or tablet PC. When the user scans a QR code (which is located on one of the windows), the data decoded by the scanner is received and stored on the PC. Then the user also selects (with a mouse or touch screen) the appropriate 3-D model in the 3-D virtual environment. In other words, the user instructs the pairing application running on the PC that the scan data just acquired with the scanner is to be associated with the 3-D object just selected—or more specifically, the 3-D location of the selected 3-D object is to be associated with the just-acquired scan data. The determination which 3-D model in the 3-D virtual environment is the appropriate 3-D model to be selected is made by the person performing this task. The person sees the virtual models on the screen and makes the decision as to which one to select based on which marker was most recently scanned in the physical environment.

In accordance with one proposed implementation, the hardware includes a scanner and a PC/tablet; the software includes the scanning application hosted by the scanner and the 3-D display application and pairing application hosted by the PC/tablet. The PC/tablet receives the unique identifier data of the encoded marker from the scanner, and retrieves from a non-transitory tangible computer-readable storage medium the 3-D location data associated with the selected 3-D object in the virtual environment. Optionally, the scanning application and the pairing application could be integrated with the 3-D display application to make one unified software application that handles all of those steps.

In accordance with an alternative embodiment, instead of a hand-held scanner, a head-mounted display with integrated camera may be used for the pairing operation. The camera in the head-mounted display would be used to read the QR code (and associated software would decode the QR code) to acquire the unique identifier data. The 3-D models may be loaded and displayed in the head-mounted display instead of a tablet or laptop. Since the user does not have a mouse when using a head-mounted display, a different type of interaction would be used to select the 3-D model that should be associated with the data from the QR code (acquired by the camera and image decoding application). For such a selection aspect of the process, head-mounted displays usually have some type of hand gesture input; a voice command could also be used.

Figure 9B:
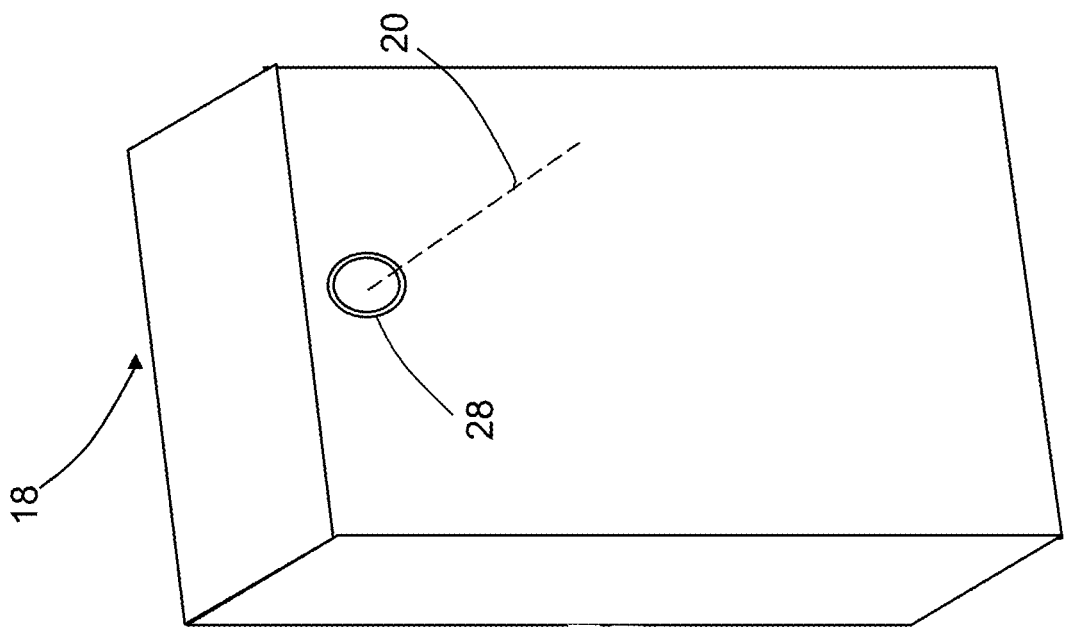
FIG. 9B is a diagram representing an isometric rear view of the handheld imaging device depicted in FIG. 9A.
Figure 9A:
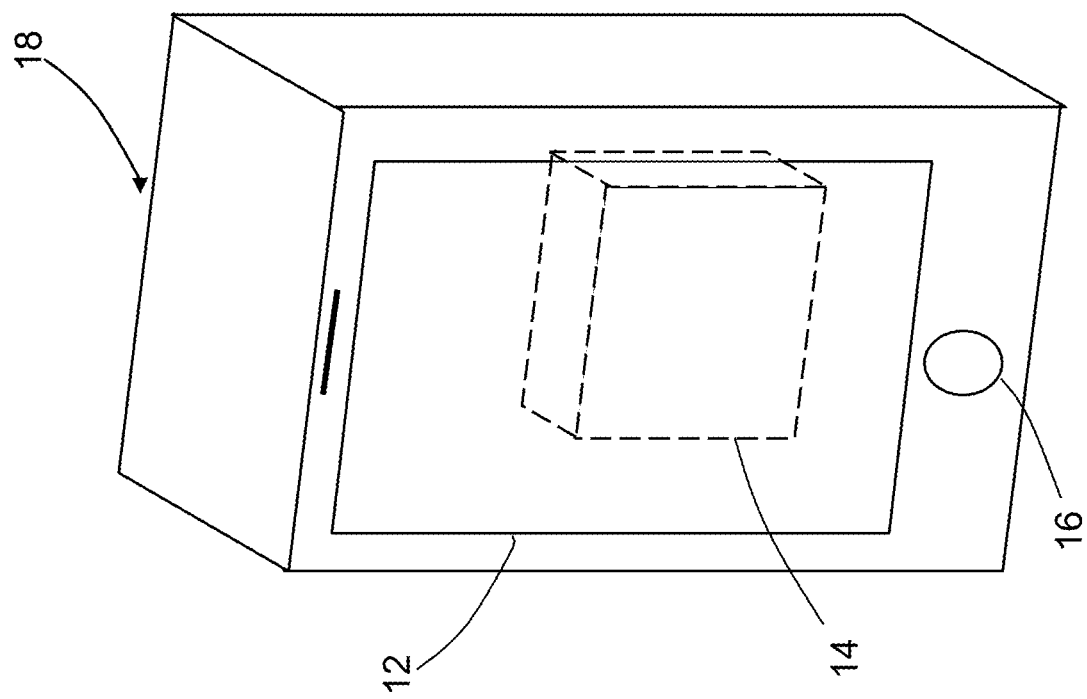
FIG. 9A is a diagram representing an isometric front view of a handheld imaging device which can be located using the methods disclosed herein.

FIGS. 9A and 9B are isometric front and rear views of an exemplary handheld imaging device 18 which may be used during the set-up process. The handheld imaging device 18 may be an iOS device (such as an iPhone® or iPad® produced by Apple Inc., Cupertino, Calif.) or other "smart phone", tablet or other handheld computing device. In accordance with the embodiment shown in FIGS. 9A and 9B, the handheld imaging device 18 comprises a display screen 12, a microprocessor 14 (indicated by dashed lines in FIG. 9A), a pushbutton 16 for activating image capture, and an integrated or attachable camera 28 having a line-of-sight 20 (indicated by a dashed line in FIG. 9B). In the alternative, image capture may be activated by pressing a virtual button which is displayed on display screen 12.

The handheld imaging device 18 may also incorporate elements for providing a wireless communication capability. In particular, the handheld imaging device 18 may have on-board 3-D graphics abilities capable of running a 3-D visualization application or it may communicate wirelessly with a remote computer system running a 3-D visualization application (not shown in FIGS. 9A and 9B). Such wireless communication may be cellular, Wi-Fi or Internet-based with intermediary receivers and transmitters as required. The remote computer system has the ability to communicate with a 3-D model database as depicted in FIG. 8. The 3-D model of the airplane is stored in a non-transitory tangible computer-readable storage medium which is accessible to the computer system that hosts the 3-D visualization application. The 3-D visualization application enables graphical representation of airplane components in their physical form.

Figure 10:
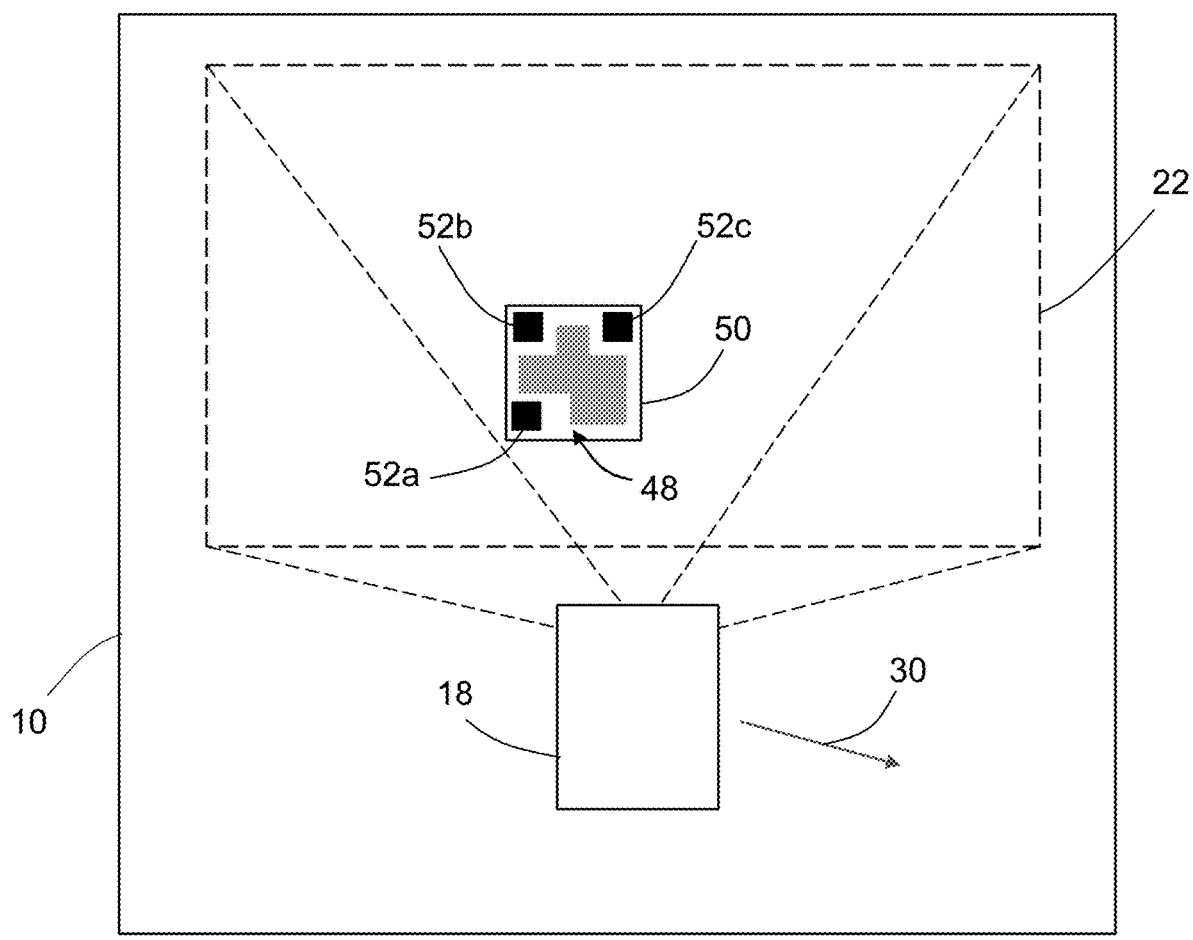
FIG. 10 is a diagram representing a schematic view of a field-of-view of a handheld imaging device projected onto a portion of a surface having a code pattern marker in the form of a label applied thereon.

FIG. 10 is a diagram representing a schematic view of the extents of a field-of-view 22 of a camera in handheld imaging device 18 projected onto a portion of an interior surface 10 of a target object that has a 2-D (e.g., rectangular) code pattern marker 50 applied thereon. In accordance with the embodiment shown in FIG. 10, the code pattern marker 50 comprises a flexible substrate having a code pattern 48 printed thereon to form a landmark location for removable or semi-permanent placement on the interior surface 10 of the target object. The code pattern 48 includes three registration fiducial symbols 52a-52c located in respective corners of the code pattern marker 50. The registration fiducial symbols 52a-52c enable continuous relative location tracking. The flexible substrate of the code pattern marker 50 may comprise a sheet of paper, a film made of polymeric material, or other suitable printable flexible material. Alternatively, a portable ink jet printer (or similar device) could be used to print the code pattern 48 directly onto a substrate (not shown in the drawings) already applied to the surface 10 (e.g., the interior surface of a window in an airplane fuselage). The microprocessor 14 of the handheld imaging device 18 is configured to decode the code pattern 48 using code pattern decoder software. The handheld imaging device 18 is also configured to communicate with an AR device remote computer system using radiofrequency signals 30.

Figure 11:
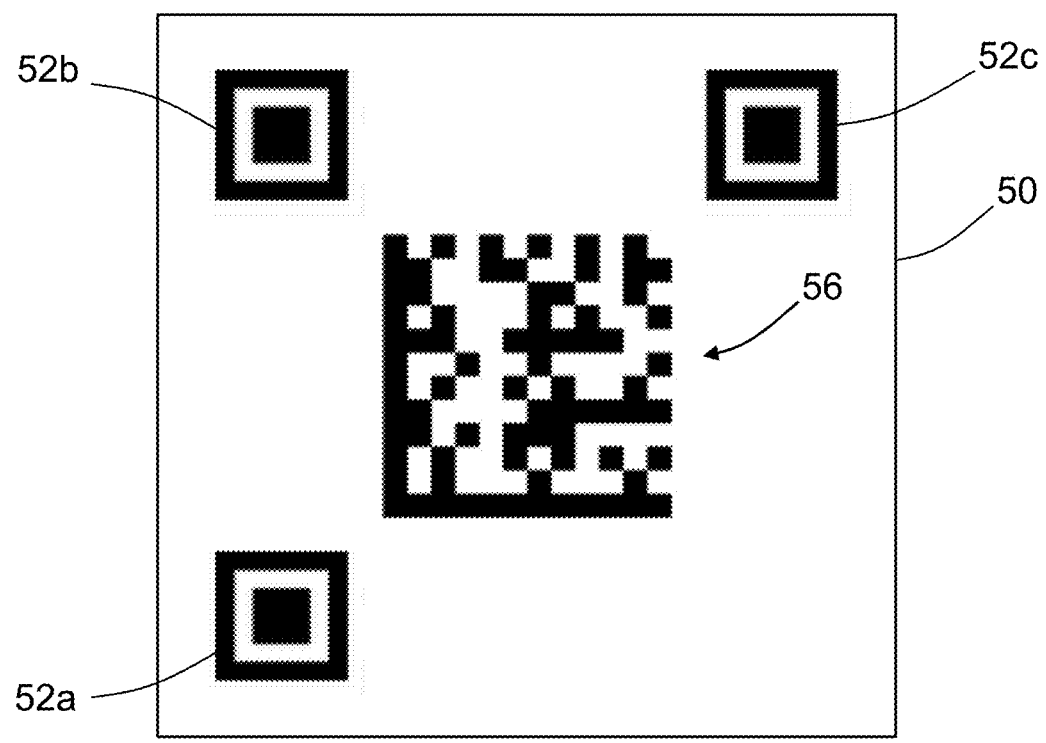
FIG. 11 is a diagram representing an example of a label having a Data Matrix code pattern and three registration fiducial symbols.

FIG. 11 is a diagram representing an example of an alternative type of rectangular code pattern marker 50 having a Data Matrix code pattern 56 and three registration fiducial symbols 52a-52c at respective corners of code pattern marker 50. The registration fiducial symbols 52a-52c are located on the marker label, but are external to the Data Matrix part of the code pattern 56 and can be used in the same way that the registration fiducial symbols 52a-52c of QR code pattern markers are used. More specifically, the fiducial symbols 52a-52c are not overlaid with the Data Matrix part of the code pattern 56 such that a blank space is defined between the fiducial symbols 52a-52c and the Data Matrix part of the code pattern 56.

Once the code pattern markers 50 have been installed, then the user can read each code pattern marker 50 with the handheld imaging device 18, which is configured to read and decode codes. The logical coordinates returned by the decoding are then mapped into the correct airplane coordinates, taking into account factors that may include major and minor airplane model and applicable assembly offsets. This landmark-to-location map (also referred to herein as a "pairing list") is created once for each collection of factors needed and prior to first use on an applicable airplane.

Figure 12:
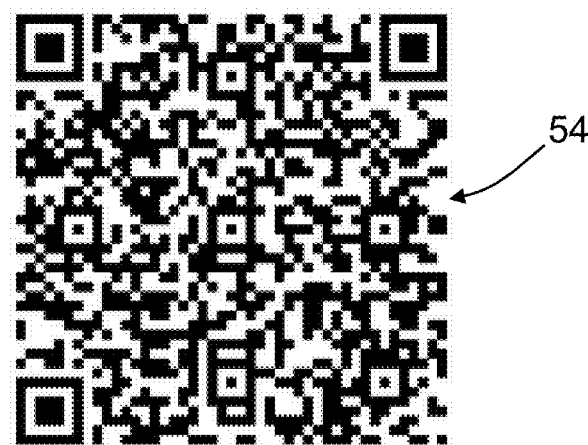
FIG. 12 is a diagram representing an example of a landmark-to-location map embodied as a QR code.

FIG. 12 is a diagram representing an example of a landmark-to-location map 54 incorporated in the payload of a QR code pattern. A marker having the landmark-to-location map 54 printed thereon can be placed anywhere on the reference object or separate from it (including being portable). The landmark-to-location map 54 is used to retrieve the associated physical airplane coordinates of detected markers in the airplane coordinate system. These physical airplane coordinates can then be fed into the AR application to set the position and orientation of virtual content displayed by the AR device to align with the physical objects being viewed by the user.

For the landmark-to-location map 54, the QR code registration symbols in respective corners of the marker are not important to the method and would be ignored when reading the map, since the landmark-to-location map is not used for continuous tracking while reading the map. If Data Matrix code patterns are used for the process instead of QR code patterns, the registration fiducial symbols 52a-52c shown in FIG. 11 would not need to be included in the marker for the landmark-to-location map.

The pairing list embodied by the landmark-to-location map 54 associates the marker identifier data decoded from the imaged QR code pattern with the 3-D location of the 3-D object (virtual environment selection). Usually the 3-D location of the 3-D object that was selected from the virtual environment corresponds to the location of the QR code pattern marker, e.g., if the markers are placed in the centers of respective window, but in some embodiments it may be the case that there is a known offset between the center of the window and the center of the QR code pattern marker. If that is the case, then the location stored in the pairing list will be adjusted by the amount of the offset.

In accordance with one embodiment, the system uses encoded markers in the form of QR codes. A QR code consists of arrays of pixel-like elements in a pattern on a white background, which can be read by an imaging device such as a camera. At run-time, the location of a QR code relative to the camera (which is part of the AR device) is acquired by leveraging a well-known QR code-based AR process to solve the camera pose problem. This process uses the "position" markings and "alignment" markings embedded in every QR code. These markings are the parts of the QR code marker that do not change, including (e.g., in Version 10 of the QR code) three relatively bigger "position" squares (a.k.a. "tracking boxes") in respective corners of the square marker and six smaller "alignment" squares (a.k.a. "tracking boxes") arranged in a grid pattern on the marker. By using this alignment technique, a user may determine the relative location (position and orientation) of the AR device's camera relative to the QR code marker. Then the user may use the location of the marker relative to the frame of reference of the physical environment (e.g., airplane coordinates) to get the absolute coordinates of a camera (AR device) defined in the reference frame.

The imaging device 26 of the AR device 92 (see FIG. 8) may be used to read the QR code information and pass that information onto other software components for additional processing. The other software components retrieve the absolute 3-D location data from the pairing table (using the unique identifier acquired during a scan of the QR code), as well as compute the relative location of the AR device 92 with respect to the QR code pattern marker 50 (computed by software using the position and alignment mark data from the QR code scan), and then perform the matrix multiplication mentioned earlier to compute the correct absolute location—which is then used to correct the estimate of the absolute location of the AR device 92.

For determination of the location (position and orientation) of the AR device 92 relative to the target object, acquisition of initial reference location information in an absolute coordinate system of the target object (such as airplane coordinates) is required. Establishing the relative location of the AR device 92 with respect to a surface of the target object is accomplished through the use of an array of QR code pattern markers 50a-50f of the type depicted in FIG. 1. The relative tracking functionality enabled by the registration fiducial symbols 52a-52c in each code pattern 48 allows the distance and relative angle from the AR device 92 to be computed. The code pattern 48 is within the field-of-view 8 (see FIG. 5) of the camera of AR device 92, and the data representing the unique landmark reference embedded in code pattern 48 will be the reference location used for subsequent motions. The relative tracking functionality enabled by the registration fiducial symbols 52a-52c in the code patterns allows the distance from the AR device 92 and the relative angle of the line-of-sight of the camera incorporated in the AR device 92 to be computed as the AR device 92 is moved.

The tracking functionality described is especially useful in situations wherein the AR device 92 has only discrete (i.e., discontinuous) access to the QR code data on the QR code pattern markers. In other words, the tracking method proposed herein does not need to view QR codes all of the time in order to be able to continuously track the AR device location. The internal AR device tracking handles the localization when QR codes are not within the field of view. More specifically, the system of the preferred approach is continuously processing the incoming image data from the camera looking for the QR codes in the environment, but it does not need a QR code in the view all of the time in order to allow the AR device to track location. The AR device only needs to see QR codes intermittently in order to correct the drift that occurs in the native localization process (such as a simultaneous location and mapping (SLAM)-based process) that is running on-board the AR device. Conversely, if at least one QR code is continuously visible (and readable) all of the time, then the system can use those code pattern markers for tracking, but the process falls back to the default "discrete update" correction approach proposed herein otherwise.

Figure 13A:
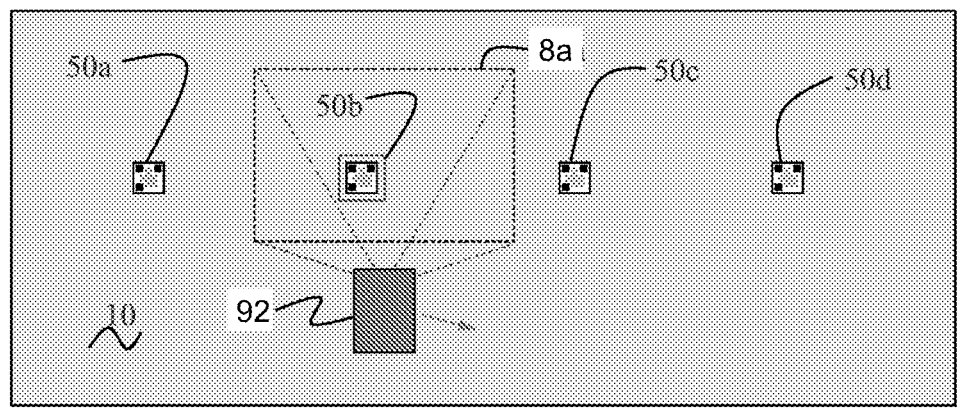
FIGS. 13A through 13C are diagrams representing respective schematic views of the field-of-view of a camera incorporated in an AR device projected onto respective areas of a surface having an array of code pattern markers applied thereon in accordance with an alternative operational mode.
Figure 13B:
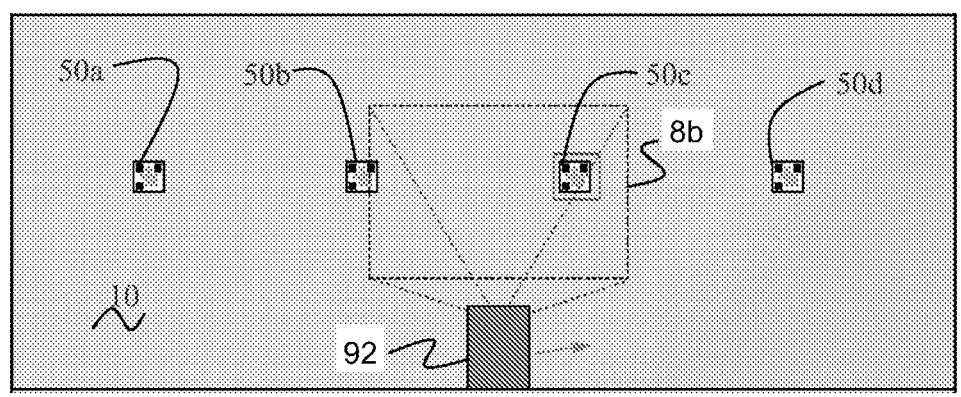
Figure 13C:
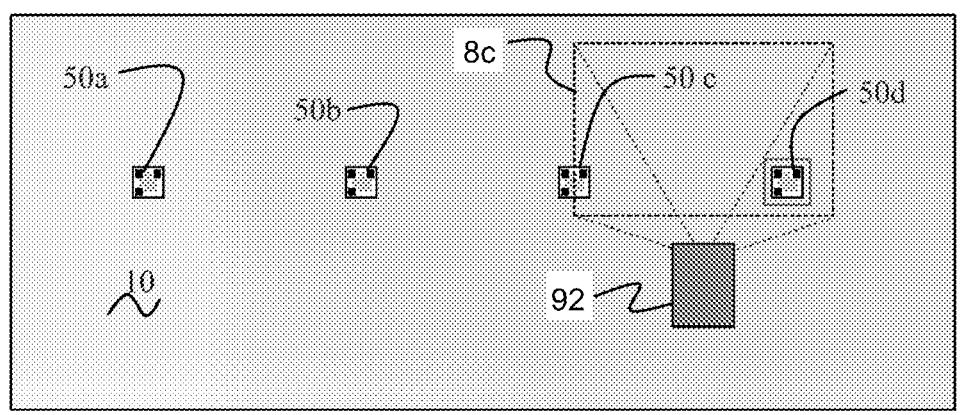

FIGS. 13A through 13C are diagrams representing respective schematic views of the field-of-view 8 of an AR device 92 projected onto respective areas of a surface 10 having an array of QR code pattern markers 50a-50d applied thereon in accordance with an alternative operational mode in which code pattern markers are continuously visible. Each of the code patterns has three registration fiducial symbols at respective corners to enable continuous determination of changes in relative position and orientation of the AR device 92 as it moves throughout the environment. Algorithms for position and orientation tracking and processing may be employed similar to those disclosed in ARToolKit supported by Human Interface Technology Laboratory (HIT Lab) at the University of Washington, HIT Lab NZ at the University of Canterbury, New Zealand, and ARToolworks, Inc., Seattle, Wash., or similar position and orientation determination software. ARToolKit uses computer vision techniques to calculate the real camera position and orientation relative to the code pattern markers. The camera of the AR device 92 captures video of the target object. Software searches through each video frame for any QR code position and alignment elements. If a sufficient number of position and alignment elements are found, the software algorithm uses mathematics to calculate the position of the camera relative to the pattern. ARToolKit gives the position of the code pattern marker in the camera coordinate system. For the embodiments described herein, software routines employing these types of location tracking algorithms operate in the computer system 24 (e.g., a microprocessor) of the AR device 92 (see FIG. 8).

The relative position and orientation of the three registration fiducial symbols 52a-52c (shown in FIG. 1) with respect to the AR device 92 provide data for determination of the camera pose relative to the surface 10 of the target object. The camera pose can be represented by a coordinate transformation matrix. This continuously updated relative localization information, along with unique reference location identification data contained within the data payload region of the code pattern read by the AR device 92, is used to provide continuous tracking in the absolute coordinate system of the target object (e.g., an airplane). This tracking functionality allows positioning at any location inside the target object so long as at least one code pattern remains within the field-of-view 8 of the AR device 92 and at a distance that can be resolved by the AR device 92. With the absolute position and orientation of the AR device 92 relative to the target object known, data from an on-board or off-board database associated with the location of interest can be retrieved. Data can be in multiple forms: text, icons, photographs, nondestructive inspection scans, video, and 3-D models, which can then be displayed on the display device 32 of the AR device 92 (see FIG. 8).

Referring again to FIGS. 13A-13C, the use of multiple code pattern markers 50a-50d spaced along an interior surface 10 of a target object (such as an airplane fuselage) allows the field-of-view 8 of the AR device 92 to be moved along the target object with the associated virtual content presented on the display device 32 being adjusted to indicate the changing location of the moving AR device 92. The code pattern markers 50a-50d may be placed with spacing on an interior surface 10 of the target object to form an array that allows the camera (not shown in FIGS. 13A-13C) to view a code pattern for use in location correction as the AR device 92 is moved or panned along that interior surface 10. In an initial location of AR device 92 shown in FIG. 13A, the code pattern marker 50b is within the field-of-view 8a of the camera of the AR device 92. Based on the unique landmark reference information incorporated in the code pattern marker 50b, the tracking functionality disclosed herein is used to determine the relative location (i.e., position and orientation) of the AR device 92 with respect to the absolute coordinate system of the interior surface 10 of the target object. Thereafter, as AR device 92 is moved to a second location shown in FIG. 13B, code pattern marker 50c comes within the field-of-view 8b of the camera of the AR device 92, allowing continuous real-time update of the relative position and orientation of the AR device 92. Similarly, upon moving the AR device 92 to a third location shown in FIG. 13C, code pattern marker 50d comes within the field-of-view 8c of the camera of the AR device 92. If more than one QR code pattern marker is in the field-of-view 8 of the camera, then it is possible to select one or the other or to interpolate position between two QR code pattern markers, which enables continuous scanning over larger regions.

As previously mentioned, the virtual content displayed by the AR device 92 may be 3-D solid models (such as 3-D CAD models) or in other forms such as 3-D lines, texture maps, or even text placed at the proper 3-D location. In accordance with some embodiments, the virtual content includes a virtual feature of an object having a 2-D marker applied thereon.

One simplification that does not require 3-D models is to use a texture map of the 2-D marker scaled to the size of the physical marker and placed at the proper location in the virtual 3-D environment. The texture map image, or parts of it, may be made transparent or semi-transparent in the visualization display to allow the physical QR code pattern to be partially visible through the AR image overlay. In the visualization environment of the AR device, the texture map will overlap the physical marker to help the user confirm that the system is properly aligned. FIG. 14 is a diagram representing the superposition of virtual content in the form of a texture map 51 representing a 2-D machine-readable code pattern on a 2-D marker applied to an object in the physical environment, which texture map 51 may be superimposed upon a view of a 2-D marker 50 having that machine-readable code pattern printed thereon. In other words, a virtual code pattern will be superimposed upon a real code pattern which is visible in the field-of-view of the user. Any misalignment of the virtual code pattern relative to the visible code pattern is an indication to the user that the AR device may not be properly calibrated and requires recalibration.

Another option is to display virtual content in the form of a geometric symbol that has a distinctive relationship to a border of the 2-D marker or to a border of the object to which the 2-D marker is applied when the AR device is properly calibrated relative to the coordinate system of the physical environment. FIGS. 15A through 15F are diagrams representing the superposition of respective geometric symbols on a view of an object (in this example, a window 58 surrounded by a window frame 46) to which a 2-D marker has been adhered. Each geometric symbol is scaled and placed at the proper location in the virtual 3-D environment. In the visualization environment of the AR device, the geometric symbol will help the user confirm that the AR system is properly aligned.

Figure 15C:
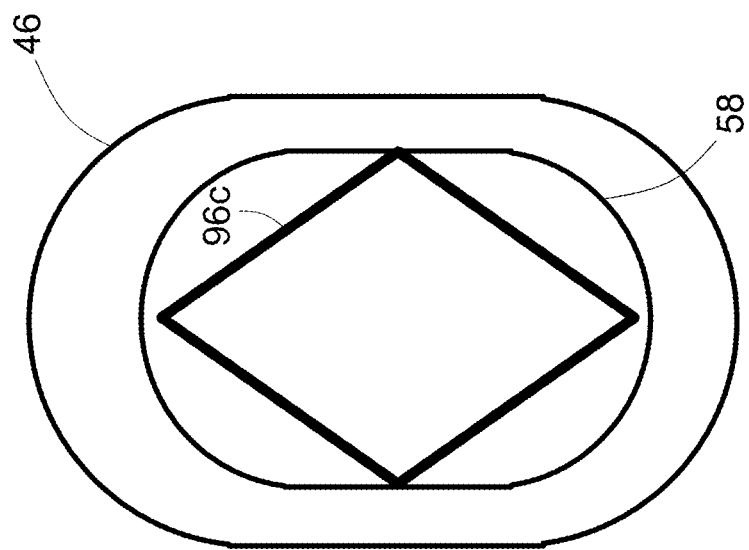
FIGS. 15A through 15F are diagrams representing the superposition of respective geometric symbols on a view of an object (in this example, a window surrounded by a window frame) to which a 2-D marker has been adhered.
Figure 15B:
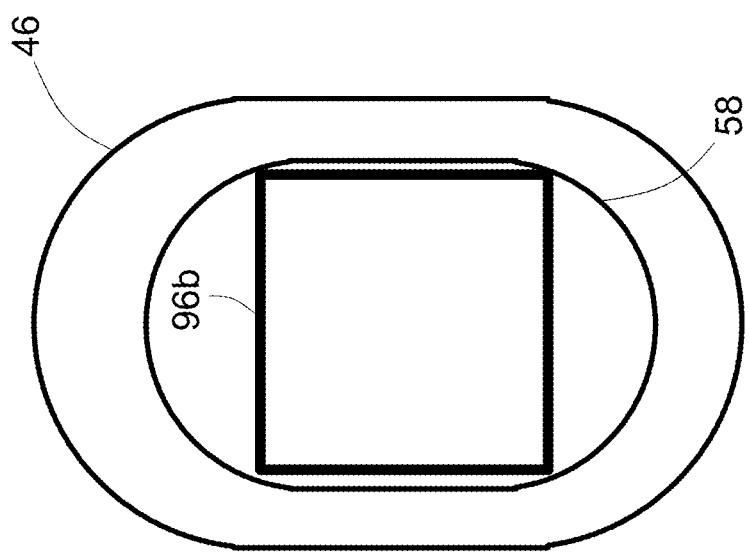
Figure 15A:
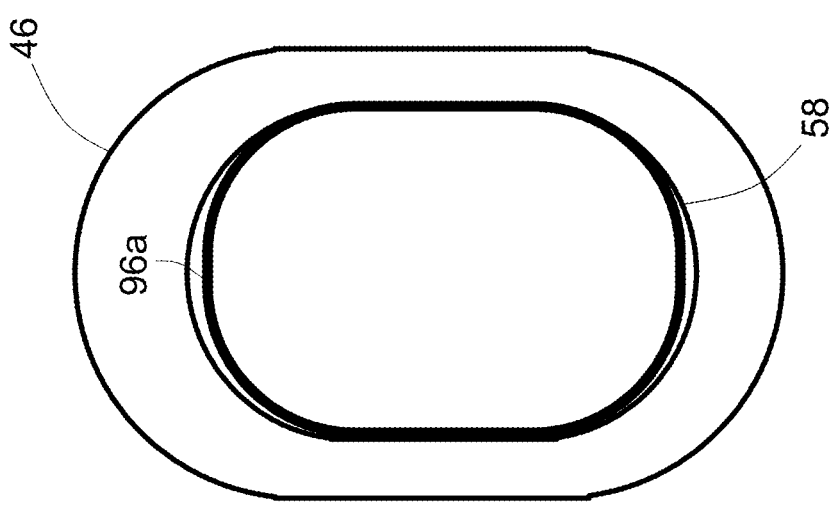
Figure 15F:
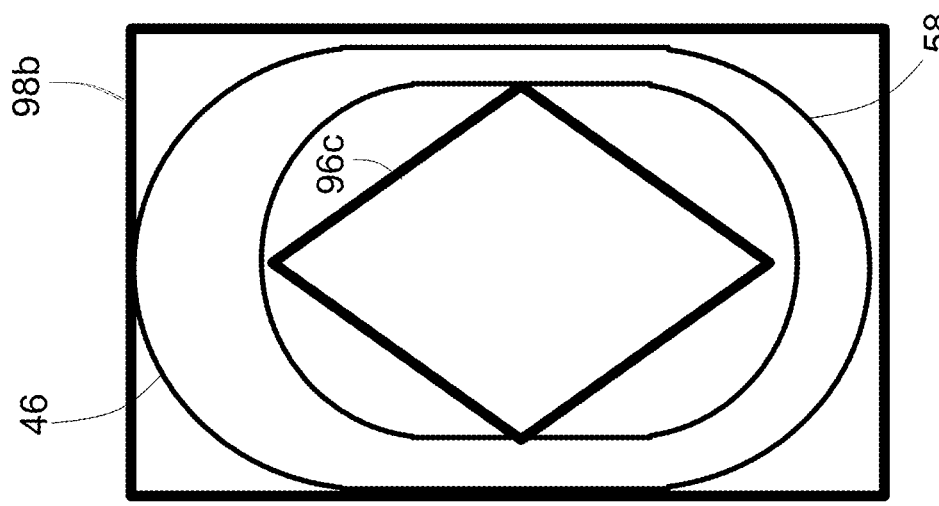
Figure 15E:
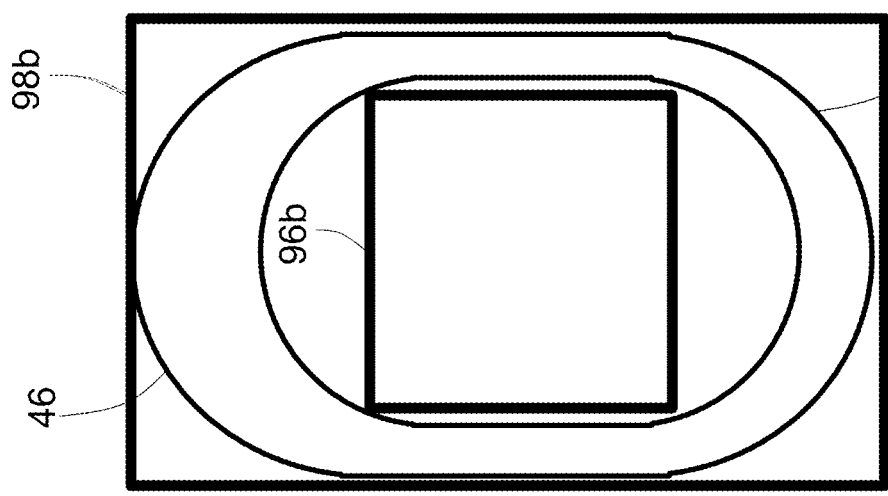
Figure 15D:
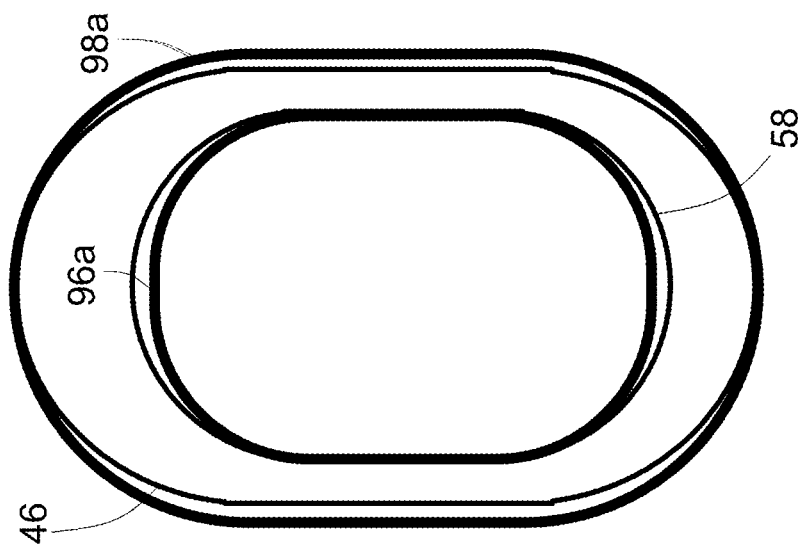

In accordance with a first embodiment depicted in FIG. 15A, the virtual feature is a geometric symbol 96a shaped and scaled to be congruent with an inner border of a window frame 46 when the virtual content is properly aligned with the physical environment. In accordance with a second embodiment depicted in FIG. 15B, the virtual feature is a geometric symbol 96b shaped (e.g., rectangular) and scaled to be congruent with a border of the 2-D marker applied to a window 58 when the virtual content is properly aligned with the physical environment. In accordance with a third embodiment depicted in FIG. 15C, the virtual feature is a geometric symbol 96c shaped (e.g., diamond-shaped) and scaled to be inscribed within an inner border of a window frame 46 when the virtual content is properly aligned with the physical environment.

Any of the variations of this virtual content may be used together. In accordance with a fourth embodiment depicted in FIG. 15D, the virtual features include a geometric symbol 96a shaped and scaled to be congruent with an inner border of a window frame 46 and a geometric symbol 98a shaped and scaled to be congruent with an outer border of the window frame 46 when the virtual content is properly aligned with the physical environment. In accordance with a fifth embodiment depicted in FIG. 15E, the virtual features include a geometric symbol 96b shaped (e.g., rectangular) and scaled to be congruent with a border of the 2-D marker applied to a window 58 and a geometric symbol 98b shaped (e.g., rectangular) and scaled to allow an outer border of a window frame 46 to be inscribed within the geometric symbol 98b when the virtual content is properly aligned with the physical environment. In accordance with a sixth embodiment depicted in FIG. 15F, the virtual features include a geometric symbol 96c shaped (e.g., diamond-shaped) and scaled to be inscribed within an inner border of a window frame 46 and a geometric symbol 98b shaped (e.g., rectangular) and scaled to allow an outer border of the window frame 46 to be inscribed within the geometric symbol 98b when the virtual content is properly aligned with the physical environment.

The AR application disclosed herein runs on a computer system that is configured to receive the marker identifier-to-3-D location pairing list and convert that information to a string of data specifying the absolute location of the AR device (i.e., specifying the viewpoint). This command message is sent to the AR application, which uses the absolute location of the AR device 92 to display virtual content which is positioned and oriented to align with objects in the physical environment being viewed by the user. The virtual content shown in these displays can be any form of computer-generated data. Some virtual content may be 3-D solid models (such as 3-D CAD models); other forms may be 3-D lines, texture maps, or even text placed at the proper 3-D location.

An AR application may be run on many different types of computer systems. As used in the claims, the term "computer system" should be construed broadly to encompass a digital data processing system having at least one computer or processor, and which may have multiple computers or processors that communicate through a network or bus or directly to each other. As used in the preceding sentence, the terms "computer" and "processor" both refer to devices comprising a processing unit (e.g., a central processing unit, an integrated circuit or an arithmetic logic unit). Examples of suitable computer systems include a smartphone, a tablet computer, a laptop computer, a desktop computer, a workstation computer, a smart watch, a head-mounted display or other wearable displays. The computer system may include at least two processors connected to each other, one of which is a graphics processor.

Figure 16:
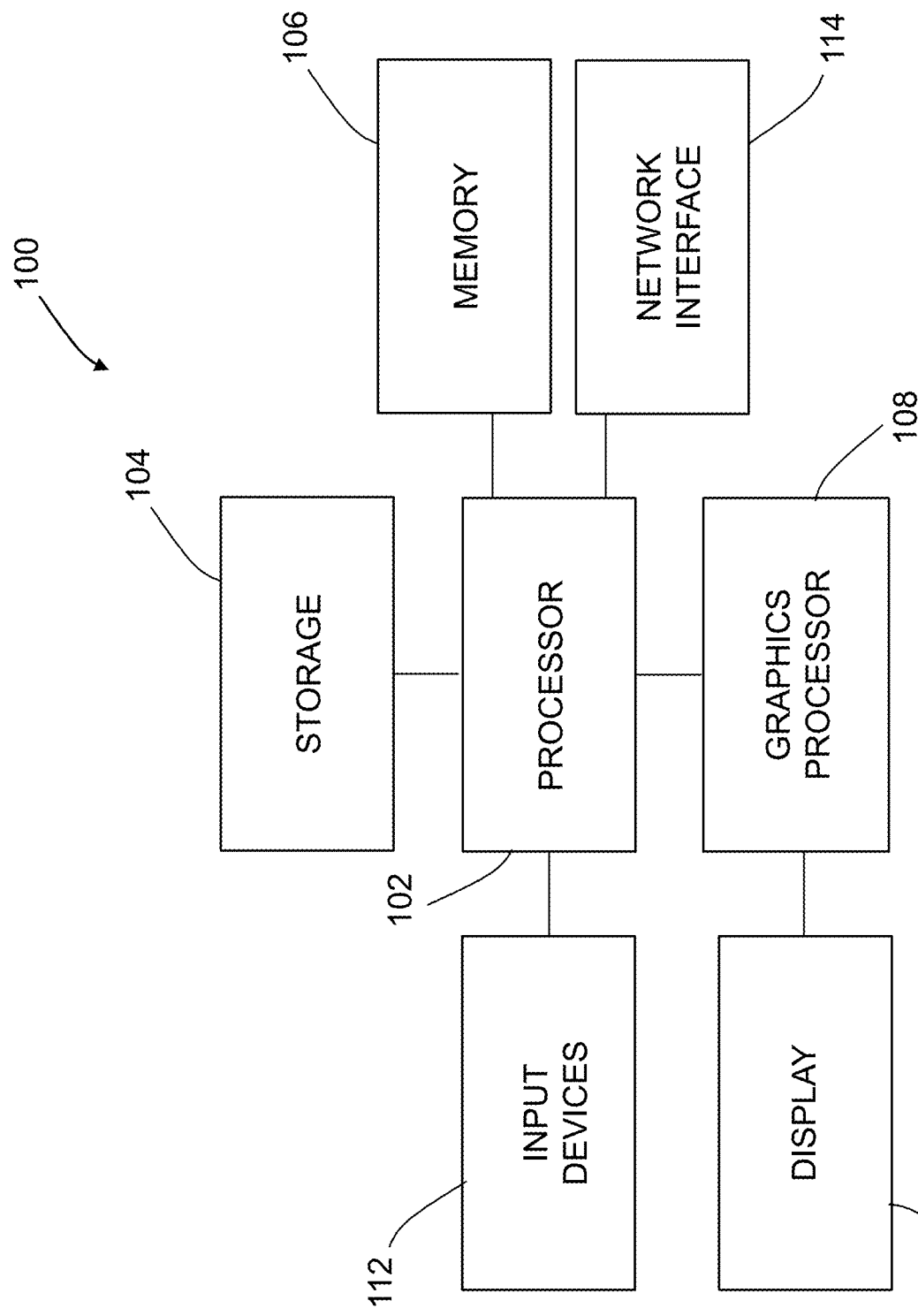
FIG. 16 is a block diagram identifying components of a system 100 suitable for hosting an augmented reality application, which system can communicate with handheld or head-mounted imaging devices.

FIG. 16 is a block diagram identifying components of a system 100 suitable for hosting an augmented reality application, which system can communicate with a handheld imaging device of the type described above. The processor 102 is generally any piece of computer hardware that is capable of executing computer programs that process data. The processor 102 may comprise electronic circuits, some of which may be packaged as an integrated circuit (e.g., a chip) or multiple interconnected integrated circuits. The processor 102 may be configured to execute computer programs, which may be stored onboard the processor or otherwise stored in a memory 106 as computer-readable program code. In alternative embodiments, the processor 102 may be embodied as or otherwise include one or more application-specific integrated circuits, field-programmable gate arrays or the like.

The storage 104 is generally any piece of hardware that is capable of storing digital data and computer programs (e.g., computer-readable program code and 3-D model files) on a permanent basis. Such storage may take the form of a hard drive, a solid-state drive, an optical disk, a magnetic tape or some combination thereof.

The memory 106 is generally any piece of computer hardware that is capable of storing digital data and computer programs (e.g., computer-readable program code and a 3-D model file) on a temporary basis. The memory 106 may include volatile and non-volatile memory, and may be fixed or removable. Examples of suitable memory include random access memory, read-only memory, a hard drive, a flash memory, a thumb drive, an SD card, a removable computer diskette, an optical disk, or some combination thereof.

In various instances, the storage 104 and the memory 106 may be referred to as a tangible computer-readable storage medium. A tangible computer-readable storage medium is a non-transitory device capable of storing information, and is distinguishable from computer-readable transmission media such as electronic transitory signals capable of carrying information from one location to another.

The system 100 further comprises one or more input devices 112 (such as the handheld imaging device 18 depicted in FIGS. 9A and 9B). The input devices 112 may be wired or wireless, and may be configured to receive information from a user into the apparatus, such as for processing, storage and/or display. Examples of suitable user input devices include a mouse, microphone, image or video capture device, keyboard or keypad, joystick, touch-sensitive surface (separate from or integrated into a touchscreen), biometric sensor or the like.

In response to the input of an augmented reality activation command from the user via input devices 112, the processor 102 retrieves a file containing virtual content from the storage 104 and stores it temporarily in the memory 106. The processor 102 selectively processes the virtual content stored in memory 106 in accordance with other user inputs received via the input devices 112 and in accordance with instructions read from the augmented reality application software stored in memory 106.

In addition to the storage 104 and 106, the processor 102 is connected to the graphics processor 108, which is in turn connected to a display device 110. The graphics processor 108 is configured to render for display digital 3-D models of a structural product composed of a plurality of parts and with respective viewpoints in response to receipt of coordinate transformation matrices from the processor 102. More specifically, the graphics processor 108 processes the 3-D model data and outputs pixel data to a digital image or raster graphics image file for display on a display device. In the alternative, it is common for high-end systems to have a central processing unit (CPU) as well as a graphics processing unit (GPU), but some systems, like lower-end computing systems or smartphones, may have a single processor with an embedded graphics processing chip (often referred to as "integrated" graphics), or even "software" rendering, which uses the CPU to render the images.

The processor 102 may also be connected to a network interface 114 for transmitting and/or receiving information, such as to and from other apparatus(es), network(s) or the like. The network interface 114 may be configured to transmit and/or receive information by physical (wired) and/or wireless communications links. Examples of suitable communication interfaces include a network interface controller (NIC), wireless NIC or the like.

The display device 110 may be configured to present or otherwise display information to a user. Suitable examples include a liquid crystal display, light-emitting diode display, plasma display panel, laser-based display (including retinal displays) or the like.

While this disclosure has focused mainly on airplane-related tasks, usage of the technology described herein is not limited to that specific field. Other manufacturing, architectural, and construction applications that use augmented reality could take advantage of this concept.

While systems, methods and devices for registering virtual content generated by an AR application with a scene being viewed by a user in an operation environment have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used herein, the term "computer system" should be construed broadly to encompass a system having at least one computer or processor, and which may have multiple computers or processors that are communicatively coupled by means of a network or bus. As used in the preceding sentence, the terms "computer" and "processor" both refer to devices comprising a processing unit (e.g., a central processing unit) and some form of memory (e.g., non-transitory tangible computer-readable storage medium) for storing a program (e.g., coded instructions) which is readable by the processing unit.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

As used in the claims, the term "properly located" means matching the locations of the objects in the physical environment. This is important because individual 3-D models in a virtual environment may not always be placed in the location where they are in the fully assembled object.

The invention claimed is:

1. A method for providing just-in-time access to data for calibrating an augmented reality device relative to an operation environment, the method comprising:
   (a) creating a multiplicity of two-dimensional (2-D) machine-readable code patterns on respective 2-D markers using first symbology representing marker identifiers uniquely identifying the respective 2-D markers and second symbology representing registration marks;
   (b) applying the respective 2-D markers to selected locations on respective objects in a physical environment;
   (c) capturing image data representing the respective 2-D markers in the physical environment;
   (d) processing the image data to acquire digital data representing the respective marker identifiers;
   (e) loading properly located three-dimensional (3-D) models representing the respective objects into a 3-D visualization environment;
   (f) acquiring digital data from the 3-D virtual environment representing 3-D locations of the respective objects from the 3-D models on which the 2-D machine-readable code patterns are attached;
   (g) pairing the marker identifiers of the respective 2-D markers with 3-D locations of the respective objects from the 3-D models;
   (h) generating a data file containing pairing list data representing a list of pairings of the marker identifiers and 3-D locations for run-time usage; and
   (i) converting the pairing list data into a form suitable for just-in-time loading onto augmented reality (AR) devices.

2. The method as recited in claim 1, wherein step (i) comprises:
   creating a 2-D machine-readable code pattern on a 2-D marker using symbology representing the pairing list data; and
   attaching the 2-D marker to a structure in the physical environment.

3. The method as recited in claim 1, wherein step (i) comprises:
   formatting the pairing list data for wireless transmission; and
   transmitting short-wavelength ultra-high-frequency radio waves modulated with information representing the pairing list data.

4. The method as recited in claim 1, wherein the 2-D machine-readable code patterns are QR codes.

5. The method as recited in claim 1, wherein the physical environment is an airplane and the objects are windows of the airplane.

6. The method as recited in claim 1, further comprising:
   (j) loading the pairing list data in an AR device;
   (k) loading virtual content in the AR device, the virtual content including a virtual feature of an object on which a 2-D marker is applied;
   (l) viewing the object in the physical environment on the AR device;
   (m) capturing image data representing the 2-D marker applied on the object;
   (n) processing the image data to acquire data representing the marker identifier and spatial positions of the registration marks of the 2-D marker applied on the object;
   (o) processing the spatial positions of the registration marks to calculate a current AR device-to-marker offset;
   (p) finding in the list of pairings a 3-D location of the object associated with the marker identifier of the 2-D marker;
   (q) calculating a 3-D location of the AR device in a frame of reference of the physical environment based on the current AR device-to-marker offset and the 3-D location of the object found in the list of pairings; and
   (r) displaying the virtual content with a viewpoint based on the current AR device-to-marker offset and the 3-D location of the object found in the list of pairings.

7. The method as recited in claim 6, wherein step (q) comprises correcting a location estimate of a localization process of the AR device.

8. The method as recited in claim 6, wherein:
   step (i) comprises creating a 2-D machine-readable code pattern on a 2-D marker using symbology representing the pairing list data and attaching the 2-D marker to a structure in the physical environment; and
   step (j) comprises optically reading the 2-D machine-readable code pattern to acquire the pairing list data and storing the acquired pairing list data in a non-transitory tangible computer-readable storage medium of the AR device.

9. The method as recited in claim 6, wherein:
   step (i) comprises formatting the pairing list data for wireless transmission and then transmitting short-wavelength ultra-high-frequency radio waves modulated with information representing the pairing list data; and
   step (j) comprises receiving the electromagnetic waves, demodulating the received electromagnetic waves to acquire the pairing list data and storing the pairing list data in a non-transitory tangible computer-readable storage medium of the AR device.

10. The method as recited in claim 6, wherein the virtual feature is a scaled texture map representing the 2-D machine-readable code pattern on the 2-D marker applied to the object.

11. The method as recited in claim 6, wherein the virtual feature is a geometric symbol shaped and scaled to be congruent with a border of the 2-D marker applied to the object or a border of the object.

12. The method as recited in claim 6, wherein the virtual feature is a geometric symbol shaped and scaled to be inscribed within a border of the object.

13. The method as recited in claim 6, wherein the virtual feature is a geometric symbol shaped and scaled to allow a border of the object to be inscribed within the geometric symbol.

14. A method for registering virtual content generated by an augmented reality application with a scene being viewed by a user in an operation environment, the method comprising:
   (a) creating a multiplicity of two-dimensional (2-D) machine-readable code patterns on respective 2-D markers using first symbology representing marker identifiers uniquely identifying the respective 2-D markers and second symbology representing registration marks;
(b) applying the respective 2-D markers to selected locations on respective objects in a physical environment;
(c) loading pairing list data in an augmented reality (AR) device, wherein the pairing list data represents pairings of marker identifiers on respective 2-D markers with 3-D locations of respective objects on which the 2-D markers are applied;
(d) loading virtual content in the AR device, the virtual content including a virtual feature of an object having a 2-D marker applied thereon;
(e) viewing the object in the physical environment on the AR device;
(f) capturing image data representing the 2-D marker applied on the object;
(g) processing the image data to acquire data representing the marker identifier and spatial positions of the registration marks of the 2-D marker applied on the object;
(h) processing the spatial positions of the registration marks to calculate a current AR device-to-marker offset;
(i) finding in the list of pairings a 3-D location of the object associated with the marker identifier of the 2-D marker;
(j) calculating a 3-D location of the AR device in a frame of reference of the physical environment based on the current AR device-to-marker offset and the 3-D location of the object found in the list of pairings; and
(k) displaying the virtual content with a viewpoint based on the current AR device-to-marker offset and the 3-D location of the object found in the list of pairings.

15. The method as recited in claim 14, wherein step (j) comprises correcting a location estimate of a localization process of the AR device.

16. The method as recited in claim 14, further comprising:
creating a 2-D machine-readable code pattern on at least one 2-D marker using symbology representing the pairing list data; and
attaching the 2-D marker to a structure in the physical environment,
wherein step (c) comprises optically reading the 2-D machine-readable code pattern to acquire the pairing list data and storing the acquired pairing list data in a non-transitory tangible computer-readable storage medium of the AR device.

17. The method as recited in claim 14, further comprising:
formatting the pairing list data for wireless transmission; and
transmitting short-wavelength ultra-high-frequency radio waves modulated with information representing the pairing list data,
wherein step (c) comprises receiving the electromagnetic waves, demodulating the received electromagnetic waves to acquire the pairing list data and storing the pairing list data in a non-transitory tangible computer-readable storage medium of the AR device.

18. The method as recited in claim 14, wherein the virtual feature is a scaled texture map representing the 2-D machine-readable code pattern on the 2-D marker applied to the object.

19. The method as recited in claim 14, wherein the virtual feature is a geometric symbol selected from a group that includes:

a geometric symbol shaped and scaled to be congruent with a border of the 2-D marker applied to the object;
a geometric symbol shaped and scaled to be congruent with a border of the object;
a geometric symbol shaped and scaled to be inscribed within a border of the object; and
a geometric symbol shaped and scaled to allow a border of the object to be inscribed within the geometric symbol.

20. An augmented reality (AR) device comprising an imaging device, a display device, a non-transitory tangible computer-readable storage medium, and a computer system communicatively coupled to the imaging device, display device, and non-transitory tangible computer-readable storage medium, wherein:
the non-transitory tangible computer-readable storage medium stores pairing list data representing pairings of marker identifiers on 2-D markers with 3-D locations of objects in a physical environment on which respective 2-D markers are applied and virtual content data representing virtual content including virtual features of objects having respective 2-D markers applied thereon; and
the computer system is configured to perform the operations comprising:
(a) processing image data from an image captured by the imaging device to acquire data representing the marker identifier and spatial positions of the registration marks of a 2-D marker applied on an object which appears in the captured image;
(b) processing the spatial positions of the registration marks to calculate a current AR device-to-marker offset;
(c) finding in the list of pairings stored in the non-transitory tangible computer-readable storage medium a 3-D location of the object associated with the marker identifier of the 2-D marker which appears in the captured image;
(d) calculating a 3-D location of the AR device in a frame of reference of the physical environment based on the current AR device-to-marker offset and the 3-D location of the object found in the list of pairings; and
(e) displaying virtual content including a virtual feature of the object with a viewpoint based on the current AR device-to-marker offset and the 3-D location of the object.

21. The system as recited in claim 20, wherein the virtual feature is a scaled texture map representing a 2-D machine-readable code pattern on the 2-D marker applied to the object.

22. The system as recited in claim 20, wherein the virtual feature is a geometric symbol selected from a group that includes:
a geometric symbol shaped and scaled to be congruent with a border of the 2-D marker applied to the object;
a geometric symbol shaped and scaled to be congruent with a border of the object;
a geometric symbol shaped and scaled to be inscribed within a border of the object; and
a geometric symbol shaped and scaled to allow a border of the object to be inscribed within the geometric symbol.

* * * * *